US012783047B2

(12) United States Patent
Kim

(10) Patent No.: US 12,783,047 B2
(45) Date of Patent: Nov. 3, 2026

(54) ELECTRONIC DEVICE AND METHOD FOR CONTROLLING ELECTRONIC DEVICE

(71) Applicant: SAMSUNG ELECTRONICS CO., LTD., Suwon-si (KR)

(72) Inventor: Dongwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/080,454

(22) Filed: Mar. 14, 2025

(65) Prior Publication Data

US 2025/0208708 A1 Jun. 26, 2025

Related U.S. Application Data

(63) Continuation of application No. PCT/KR2023/010667, filed on Jul. 24, 2023.

(30) Foreign Application Priority Data

Sep. 15, 2022 (KR) ........................ 10-2022-0116682
Nov. 24, 2022 (KR) ........................ 10-2022-0159492

(51) Int. Cl.
*G06F 3/01* (2006.01)
*G06T 3/40* (2024.01)

(52) U.S. Cl.
CPC ................ *G06F 3/013* (2013.01); *G06T 3/40* (2013.01)

(58) Field of Classification Search
CPC .......... G06F 3/013; G06F 3/01; G06F 3/0481; G06F 3/0484; G06T 3/40
See application file for complete search history.

(56) References Cited

U.S. PATENT DOCUMENTS 11,571,121 B2 * 2/2023 Kim .................... G06F 11/3041
2015/0309565 A1 10/2015 Beri et al.
(Continued)

FOREIGN PATENT DOCUMENTS

KR 10-2005-0106808 A 11/2005
KR 10-2011-0040206 A 4/2011
(Continued)

OTHER PUBLICATIONS

International Search Report and Written Opinion (PCT/ISA/220, PCT/ISA/210, and PCT/ISA/237) dated Oct. 23, 2023, issued by International Searching Authority for International Application No. PCT/KR2023/010667.

*Primary Examiner* — Amit Chatly
(74) *Attorney, Agent, or Firm* — Sughrue Mion, PLLC

(57) ABSTRACT

An electronic device comprising at least one sensor; a memory comprising at least one instruction; and at least one processor configured to execute the at least one instruction to: determine, through the at least one sensor, a location of a user, wherein the location comprises: a distance between the user and a screen on which an image, which is output from the electronic device, is displayed, and a direction of the user with respect to the electronic device, select a target object in a first area, which corresponds to a direction in which the user is located, among an entire area displayed on the screen, and control the target object to be enlarged, when the at least one processor determines that the distance between the user and the screen is within a first threshold distance.

15 Claims, 22 Drawing Sheets

(56) References Cited

U.S. PATENT DOCUMENTS

| | | | | |
|---|---|---|---|---|
| 2016/0231809 | A1* | 8/2016 | Yasuda | G06V 40/165 |
| 2018/0120935 | A1* | 5/2018 | Kim | G02B 27/017 |
| 2022/0004255 | A1 | 1/2022 | Kim et al. | |

FOREIGN PATENT DOCUMENTS

| | | | | | |
|---|---|---|---|---|---|
| KR | 10-1253756 | B1 | | 4/2013 | |
| KR | 10-2014-0064492 | A | | 5/2014 | |
| KR | 20140064492 | A | * | 5/2014 | H04M 1/72403 |
| KR | 10-1889463 | B1 | | 8/2018 | |
| KR | 10-2020-0040716 | A | | 4/2020 | |
| KR | 10-2020-0043786 | A | | 4/2020 | |
| KR | 20200043786 | A | * | 4/2020 | H04N 21/816 |
| KR | 10-2355139 | B1 | | 1/2022 | |
| KR | 10-2022-0074543 | A | | 6/2022 | |
| KR | 10-2419507 | B1 | | 7/2022 | |

* cited by examiner

HISTORY TABLE 1501

| | AVATAR 1 | AVATAR 2 | AVATAR 3 |
|---|---|---|---|
| DISTANCE CHANGE | 1m | 0.5m | 1.5m |
| DISTANCE CHANGE | 3s | 10s | 4s |
| SCORE (DISTANCE CHANGE x VIEWING TIME) | 3 POINTS | 5 POINTS | 6 POINTS |

ELECTRONIC DEVICE AND METHOD FOR CONTROLLING ELECTRONIC DEVICE

CROSS-REFERENCE TO RELATED APPLICATIONS

This application is a by-pass continuation application of International Application No. PCT/KR2023/010667, filed on Jul. 24, 2023, which is based on and claims priority to Korean Patent Application Nos. 10-2022-0116682, filed on Sep. 15, 2022, and 10-2022-0159492, filed on Nov. 24, 2022, in the Korean Intellectual Property Office, the disclosures of which are incorporated by reference herein their entireties.

BACKGROUND

1. Field

The disclosure relates to an electronic device and a method of controlling the electronic device. More particularly, the disclosure relates to an electronic device for displaying immersive content and a method of controlling the electronic device.

2. Description of Related Art

Recently, interest in the next-generation media environment that provides a user with a virtual environment similar to a real environment has increased. In particular, metaverse is in the spotlight as a representative service that provides a user with a virtual environment. The metaverse is a compound word of meta (virtual and abstract) and universe (the real world). The metaverse refers to a three-dimensional (3D) virtual world. The core technology of the metaverse is extended reality (XR) that encompasses virtual reality (VR), augmented reality (AR), and mixed reality (MR).

Immersive content including a metaverse environment may be implemented by immersive displays and wearable devices. For example, a metaverse environment may be implemented by a personal wearable display device (e.g., a head-mounted display (HMD)). Also, the market for non-wearing type displays that may provide immersion and presence to users without wearing devices has recently increased. Examples of the non-wearing type displays may include a 360° projector, a multi-faceted screen or a room-type screen using a large display panel, a hemispherical screen, and a 3D screen.

SUMMARY

According to an aspect of the disclosure, an electronic device comprising at least one sensor; a memory comprising at least one instruction; and at least one processor configured to execute the at least one instruction to: determine, through the at least one sensor, a location of a user, wherein the location comprises: a distance between the user and a screen on which an image, which is output from the electronic device, is displayed, and a direction of the user with respect to the electronic device, select a target object in a first area, which corresponds to a direction in which the user is located, among an entire area displayed on the screen, and control the target object to be enlarged, based on the distance between the user and the screen being within a first threshold distance.

According to an aspect of the disclosure, a method of controlling an electronic device, the method comprising:

determining, through at least one sensor, a location of a user, wherein the location comprises a distance between the user and a screen on which an image output from the electronic device is displayed, and a direction of the user with respect to the electronic device; selecting a target object in a first area, which corresponds to a direction in which the user is located, among an entire area displayed on the screen; and controlling the target object to be enlarged, based on the distance between the user and the screen being within a first threshold distance.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
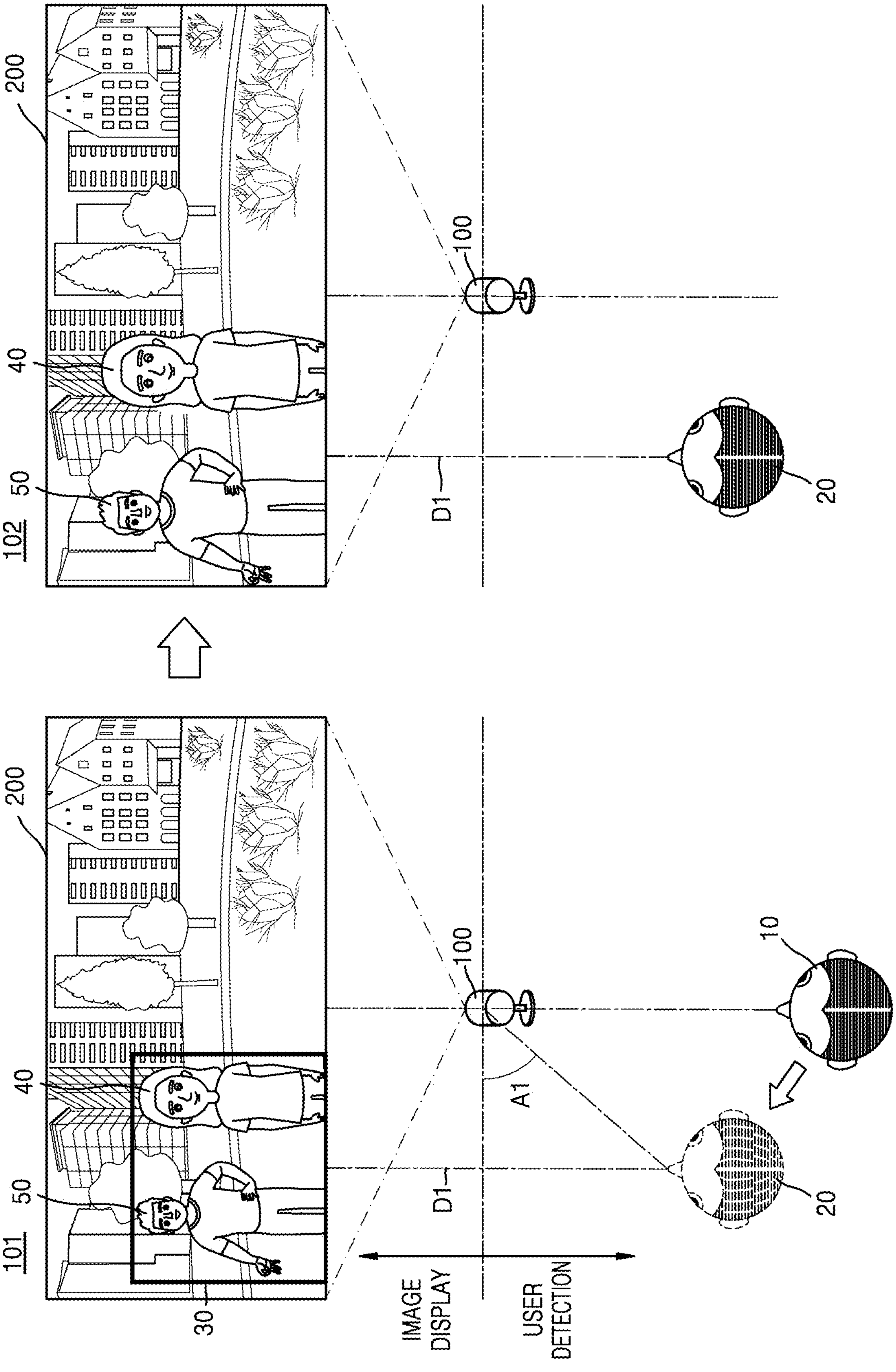
FIG. 1 illustrates an example in which an electronic device enlarges an object, according to an embodiment of the disclosure.

The terms used herein will be briefly described, and the disclosure will be described in detail.

The terms used herein are general terms currently widely used in the art in consideration of functions in the disclosure, but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein may be defined based on the unique meanings thereof and the whole context of the disclosure.

When a certain part "includes" a certain component, the part does not exclude another component but may further include another component, unless the context clearly dictates otherwise. Also, the term used in the embodiments such as "... unit" or "... module" indicates a unit for processing at least one function or operation, and may be implemented in hardware, software, or in a combination of hardware and software.

Embodiments will now be described more fully with reference to the accompanying drawings for one of ordinary skill in the art to be able to perform the embodiments without any difficulty. However, the disclosure may be embodied in many different forms and is not limited to the embodiments set forth herein. For clarity, portions irrelevant to the descriptions of the disclosure are omitted in the drawings, and like components are denoted by like reference numerals throughout the specification.

The term "user" used herein refers to a person who controls a function or an operation of a computing device or an electronic device by using a control device, and may include a viewer, a manager, or an installation engineer.

The terms "processor" may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

Hereinafter, the disclosure will be described in detail with reference to the attached drawings.

FIG. 1 illustrates an example in which an electronic device enlarges an object, according to an embodiment of the disclosure.

Referring to FIG. 1, an electronic device 100 according to an embodiment of the disclosure may be implemented as any of various devices including a display. For example, the electronic device 100 may be implemented as any of various electronic devices such as a mobile phone, a tablet PC, a digital camera, a camcorder, a laptop computer, a tablet PC, a desktop, an e-book terminal, a digital broadcasting terminal, a personal digital assistant (PDA), a portable multimedia player (PMP), a navigation device, an MP3 player, or a wearable device. In particular, embodiments may be easily implemented in an electronic device capable of immersively displaying a three-dimensional (3D) graphic image, and may include, but not limited to, a 360° projector, a multi-faceted screen or a room-type screen using a large display panel, a hemispherical screen, or a 3D screen.

The electronic device 100 according to an embodiment of the disclosure may display an image on a screen 200. The electronic device 100 may include a display panel providing the screen 200, or may include a projector configured to project light onto the screen 200 so that content is displayed on the screen 200. Here, the term "image" may be, but is not limited to, a 3D graphic image. For example, the electronic device 100 may display content including an image, text, and an application made of 3D graphics. For example, the electronic device 100 may display metaverse content. Although the electronic device 100 illustrates an image on the screen 200 through a projector, the disclosure is not limited to the above embodiment.

The electronic device 100 according to an embodiment of the disclosure is a projection device for enlarging and projecting light output from a light source onto a wall or a screen through a projection lens. The electronic device 100 may output an image by using a projection display method (e.g., digital light processing (DLP)) using a digital micromirror display (DMD). In addition, the electronic device 100 may include a cathode ray tube (CRT) projector or a liquid crystal display (LCD) projector.

The electronic device 100 according to an embodiment of the disclosure may display an image on the screen 200 on one side, and may detect a gaze of a user or a location of the user on the other side opposite to the one side. For example, in FIG. 1, the electronic device 100 may display an image on the screen 200 on one side of the electronic device 100 and may detect a location of the user on the other side.

The electronic device 100 according to an embodiment of the disclosure may recognize and enlarge an object that the user is interested in among an entire area of the screen 200 through the gaze of the user and the location of the user.

Referring to FIG. 1, a state before enlargement 101 and a state after enlargement 102 are illustrated.

The enlargement 101 of FIG. 1 shows a state before the electronic device 100 enlarges an image displayed on the screen 200. In general, a user 10 may look at the screen 200 from the center, and when an object of interest is displayed on the screen 200, the user 10 may approach a side where the object of interest is located. For example, the user 20 may move to one side, for example, a left side, where the object of interest is displayed based on the electronic device 100. The electronic device 100 according to an embodiment may determine a location of a user 20. For example, the electronic device 100 may determine a location of the user 20 through a distance D1 between the screen 200 and the user 20 and a direction of the user 20. The direction of the user 20 with respect to the electronic device 100 may be determined through an angle A1 of the user 20 with respect to the electronic device 100.

In an embodiment of the disclosure, the electronic device 100 may determine a first area 30 corresponding to a direction in which the user 20 is located among the entire area of the screen 200. For example, the electronic device 100 may determine a portion of the entire area of the screen 200 facing a gaze of the user 20 as the first area 300. The electronic device 100 may select a target object 40 to be enlarged from among at least one object (e.g., 40 and 50) included in the first area 30. For example, the electronic device 100 may recognize text, numbers, characters, and avatars included in the first area 30 and may determine one of them as the target object 40.

The enlargement 102 of FIG. 1 shows a state after the electronic device 100 enlarges the image displayed on the screen 200. The electronic device 100 may control the target object 40 to be enlarged, when the electronic device 100 (or the processor 110) determines that the distance D1 between the screen 200 and the user 20 is within a first threshold distance. The electronic device 100 may display an image including the target object 40 closer to the user 20. For example, the electronic device 100 may enlarge and display the target object 40 as if a camera photographing the target object 40 is approaching the target object 40. For example, as the user approaches the target object, the target object and a surrounding background or a surrounding object (e.g., 50) of the target object within a field of vision of the user may be enlarged together. In this case, an image enlarged by a processor 110 may be displayed as a continuous image on the screen.

The electronic device 100 according to an embodiment of the disclosure may detect a location change of the user, and may enlarge the target object to be enlarged by determining a location of the user. The electronic device 100 may enhance user experience (UX) by automatically enlarging an object that the user is interested in.

Figure 2:
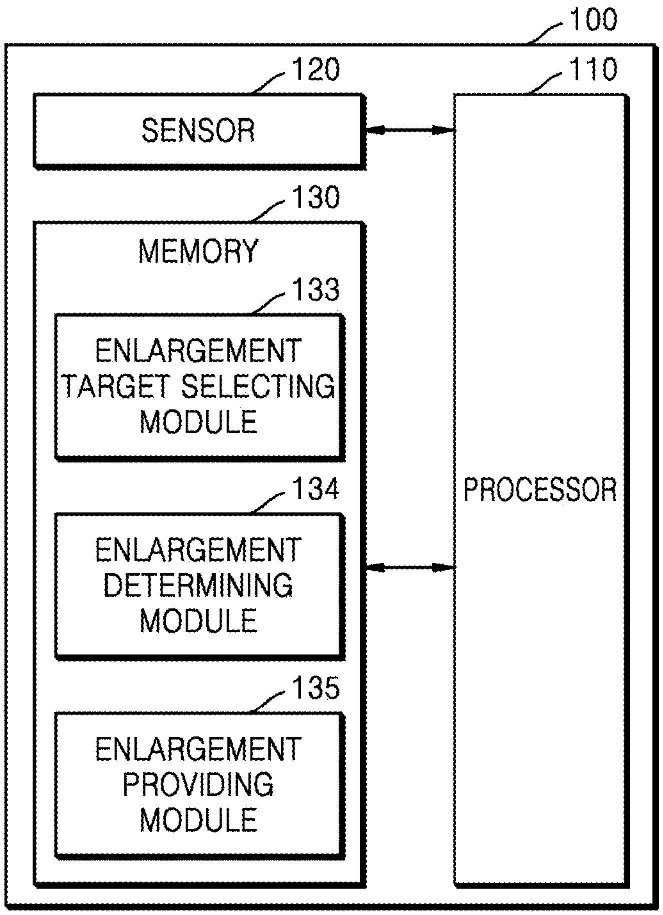
FIG. 2 illustrates a configuration of an electronic device, according to an embodiment of the disclosure.

FIG. 2 illustrates a configuration of an electronic device, according to an embodiment of the disclosure.

Referring to FIG. 2, the electronic device 100 may include a sensor 120, a memory 130, and the processor 110.

The sensor 120 according to an embodiment may detect a gaze of a user or may detect a location of the user. The location of the user may include a distance between the user and the electronic device 100 and a direction of the user with respect to the electronic device 100. The sensor 120 according to an embodiment may include at least one sensor. A sensing value related to the gaze of the user and the location of the user detected by the sensor 120 may be output to the processor 110.

The memory 130 according to an embodiment may store various data, a program, or an application for driving and controlling the electronic device 100. Also, the program stored in the memory 130 may include one or more instructions. The program (the one or more instructions) or the application stored in the memory 130 may be executed by the processor 110.

The memory 130 according to an embodiment may store an enlargement target selecting module 133, an enlargement determining module 134, and an enlargement providing module 135.

The processor 110 according to an embodiment may control an overall operation of the electronic device 100. The processor 110 may execute one or more instructions stored in the memory 130.

The processor 110 according to an embodiment may execute one or more instructions included in the enlargement target selecting module 133, the enlargement determining module 134, and the enlargement providing module 135. The processor 110 according to an embodiment may execute one or more instructions to determine a location of a user, including a distance between the user and a screen on which an image output from the electronic device 100 is displayed and a direction of the user with respect to the electronic device 100, through the at least one sensor 120.

The processor 110 according to an embodiment may execute one or more instructions included in the enlargement target selecting module 133 to select a target object included in a first area corresponding to a direction in which the user is located among an entire area of the screen. The processor 110 according to an embodiment may execute one or more instructions included in the enlargement determining module 134 to determine whether a distance between the user and the first area of the screen is within a first threshold distance. The processor 110 according to an embodiment may execute one or more instructions included in the enlargement providing module 135 to enlarge the target object, when the distance between the user and the first area of the screen is within the first threshold distance.

Figure 3:
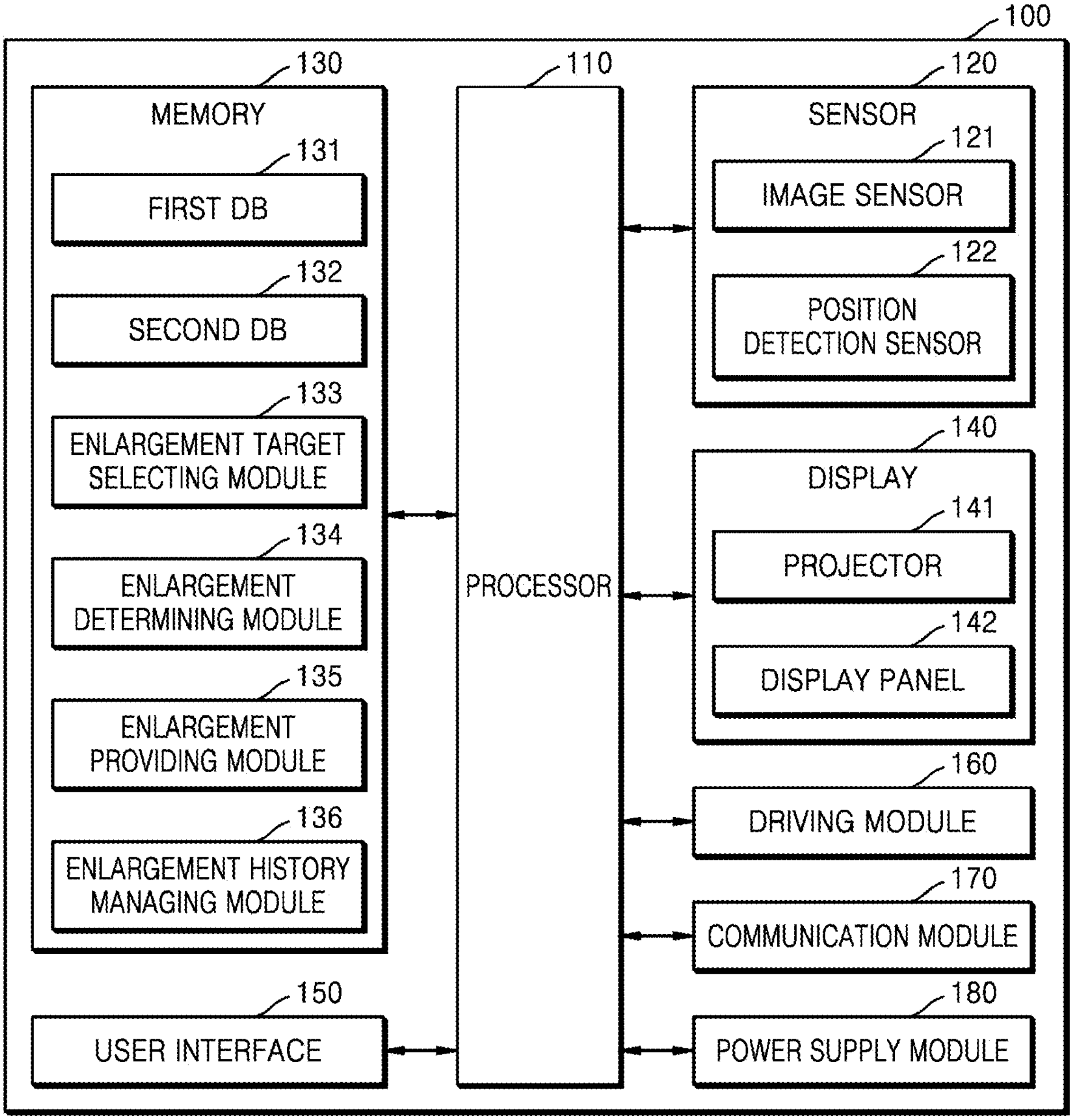
FIG. 3 illustrates a detailed configuration of an electronic device, according to an embodiment of the disclosure.

FIG. 3 illustrates a detailed configuration of an electronic device, according to an embodiment of the disclosure.

Referring to FIG. 3, the electronic device 100 may include the sensor 120, the memory 130, a display 140, a user interface 150, a driving module 160, a communication module 170, a power supply module 180, and the processor 110.

The sensor 120 according to an embodiment may include an image sensor 121 and a position detection sensor 122. The image sensor 121 according to an embodiment may obtain an image frame such as a still image or a moving image through a camera. For example, the image sensor 121 may receive an image of a user within a camera recognition range. The image of the user captured through the image sensor 121 may be processed through the processor 110, and the processor 110 may analyze the image of the user to obtain information about a gaze change of the user, a gesture of the user, and a location of the user.

The position detection sensor 122 according to an embodiment may detect a location of the user. The position detection sensor 122 may measure a distance to an object and may measure a direction with respect to the object. For example, the position detection sensor 122 may include a time of flight (ToF) sensor or a millimeter wave (mmWave) sensor. In an embodiment, the position detection sensor 122 may measure a distance between a screen and the user, by measuring a distance between the user and the electronic device 100 and a distance between the electronic device 100 and the screen. The position detection sensor 122 may measure a direction of the user with respect to the electronic device 100. The location of the user measured through the position detection sensor 122 may be processed through the processor 110.

The memory 130 according to an embodiment may store various data generated during an operation of the electronic device 100. The memory 130 may include a flash memory type, a hard disk type, a multimedia card micro type, or a card type memory (e.g., SD or XD memory), and may include a non-volatile memory including at least one of a read-only memory (ROM), an electrically erasable programmable read-only memory (EPPROM), a programmable read-only memory (PROM), a magnetic memory, a magnetic disk, and an optical disk, and a volatile memory such as a random-access memory (RAM) or a static random-access memory (SRAM).

The memory 130 according to an embodiment may store one or more instructions and/or a program so that the electronic device 100 operates to obtain information about an object. The memory 130 according to an embodiment may store the enlargement target selecting module 133, the enlargement determining module 134, the enlargement providing module 135, and an enlargement history managing module 136.

The memory 130 according to an embodiment may include a first DB 131 and a second DB 132. The first DB 131 and the second DB 132 may be configured as one device with the enlargement target selecting module 133, the enlargement determining module 134, the enlargement providing module 135, and the enlargement history managing module 136, or may be configured as separate storage devices to manage data.

The first DB 131 according to an embodiment may store information about one or more objects included in a 3D graphic image. The first DB 131 may include an attribute value of at least one of a text object, a number object, a character object, and an avatar object. The first DB 131 may store information about a priority of objects for each user.

The second DB 132 according to an embodiment may store information about one or more objects included in a 3D graphic image. The second DB 132 may include an attribute value of a user-customized object. The second DB 132 may store information about a priority of objects for each user.

The display 140 according to an embodiment may provide a screen on which a 3D graphic image is displayed. The display 140 generates a driving signal by converting an image signal, a data signal, an OSD signal, and a control signal processed by the processor 110.

The display 140 may include a projector 141 and a display panel 142. Although the electronic device 100 includes both the projector 141 and the display panel 142 in FIG. 3, the disclosure is not limited to the above embodiment, and the electronic device 100 may include only one of the projectors 141 and the display panel 142.

When the electronic device 100 according to an embodiment includes the projector 141, the electronic device 100 may be a projector display device. The electronic device 100 may display an image on the screen by projecting light onto the screen through the projector 141. The projector 141 may include a light source for projection such as an LED and a laser. The projector 141 may include an optical system such as a lens. The projector 141 may output an image by using a projection display method (e.g., digital light processing (DLP)) using a digital micromirror display (DMD). The projector 141 may include a cathode ray tube (CRT) projector or a liquid crystal display (LCD) projector.

When the electronic device 100 according to an embodiment includes the display panel 142, the electronic device 100 may provide the screen through the display panel 142. The display panel 142 according to an embodiment may include a PDP, an LCD, or an OLED flexible display, or may include a 3D display.

The user interface 150 according to an embodiment may include an input interface and an output interface. The input interface may receive an input from the user and may transmit the input to the processor 110. The input interface may include, for example, a button, a remote controller, a touchscreen, and a voice input microphone. The output interface may output various information related to the electronic device 100. The output interface includes a display, a light emitting diode (LED), or a speaker.

The driving module 160 according to an embodiment may control a direction, an angle, and a location of the electronic device 100 under the control of the processor 110. For example, the driving module 160 may control a direction of the projector 140 to rotate 360° under the control of the processor 110. For example, the driving module 160 may control the electronic device 100 to move in a left-right direction under the control of the processor 110.

The communication module 170 according to an embodiment may transmit and receive data or a signal to and from an external device or a server under the control of the processor 110. The communication module 170 may include, but is not limited to, a Bluetooth communication unit, a Bluetooth low energy (BLE) communication unit, a near field communication unit, a WLAN (Wi-Fi) communication unit, a Zigbee communication unit, an infrared data association (IrDA) communication unit, a Wi-Fi direct (WFD) communication unit, an ultra-wideband (UWB) communication unit, an Ant+ communication unit, or a microwave (uWave) communication unit according to the performance and structure of the electronic device 100.

The power supply module 180 according to an embodiment may supply power input from an external power source to elements in the electronic device 100 under the control of the processor 110. For example, the power supply module 180 may include a power cable or a battery located inside the electronic device 100.

The processor 110 according to an embodiment may execute programs stored in the memory 130 to control the sensor 120, the display 140, the user interface 150, the driving module 160, the communication module 170, and the power supply module 180. The processor 110 may include a separate neural processing unit (NPU) that performs an operation of an artificial intelligence model. Also, the processor 110 may include a central processing unit (CPU) and a graphics processing unit (GPU). In the disclosure, the processor 110 may include one or more processors.

The processor 110 according to an embodiment may determine a location of a user, including a distance between the user and a screen on which an image output from the electronic device is displayed and a direction of the user with respect to the electronic device through at least one sensor 120. The processor 110 according to an embodiment may determine whether there is a gaze change of the user, by tracking a gaze of the user through the image sensor 121. Based on the determination that there is a gaze change of the user, the processor 110 according to an embodiment may determine a location of the user by obtaining a distance and a direction of the user through the position detection sensor 122.

The processor 110 according to an embodiment may execute one or more instructions of a program stored in the memory 130 to control an object displayed on the screen to be enlarged. For example, the processor 110 may execute one or more instructions included in the enlargement target selecting module 133, the enlargement determining module 134, and the enlargement providing module 135.

The processor 110 according to an embodiment may execute one or more instructions of the enlargement target selecting module 133 to select a target object included in a first area corresponding to a direction in which the user is located among an entire area displayed on the screen.

The processor 110 according to an embodiment may execute one or more instructions included in the enlargement determining module 134 and the enlargement providing module 135 to control the target object to be enlarged, when the electronic device 100 (or the processor 110) determines that a distance between the screen and the user is within a first threshold distance.

The processor 110 according to an embodiment may execute one or more instructions of the enlargement target selecting module 133 to determine an area facing a gaze of the user at the location of the user as the first area of the screen. The processor 110 may select a target object included in the first area. The processor 110 may determine a coordinate value of the selected target object.

The processor 110 according to an embodiment may compare attribute values of objects stored in the memory 130 with an attribute value detected from at least one object included in the first area. When the electronic device 100 (or the processor 110) determines that at least one object matches any one of the objects stored in the memory 130, the processor 110 may select the at least one object as the target object. For example, each of the first DB 131 and the second DB 132 may include information about an object and an attribute value of the object.

When the electronic device 100 (or the processor 110) determines that the user is located within the first threshold distance from the first area of the screen for a certain period of time, the processor 110 according to an embodiment may control the target object included in the first area to be enlarged. The processor 110 according to an embodiment may store information about the target object in the memory 130.

The processor 110 according to an embedment may execute one or more instructions of the enlargement history managing module 136 to update a history table including information about a distance change value between the user and the target object and a viewing time of the user for the target object, to the memory 130.

The processor 110 according to an embodiment may execute one or more instructions of the enlargement history managing module 136 to calculate an enlargement priority of the objects stored in the memory 130 based on the updated history table. The processor 110 according to an embodiment may select a target object to be enlarged, based on the calculated priority from among objects included in the first area.

When the electronic device 100 (or the processor 110) determines that the distance between the screen and the user is within the first threshold distance, the processor 110 according to an embodiment may execute one or more instructions included in the enlargement providing module 135 to display a message asking the user whether to enlarge an object on the screen.

The processor 110 according to an embodiment may execute one or more instructions included in the enlargement providing module 135 to control the first area including the target object to be enlarged on a portion of the entire area displayed on the screen. When the electronic device 100 (or the processor 110) determines that the distance between the user and the screen is within a second threshold distance shorter than the first threshold distance based on the direction in which the user is located, the processor 110 according to an embodiment may control the first area including the target object to be enlarged on the entire area of the screen.

Figure 4:
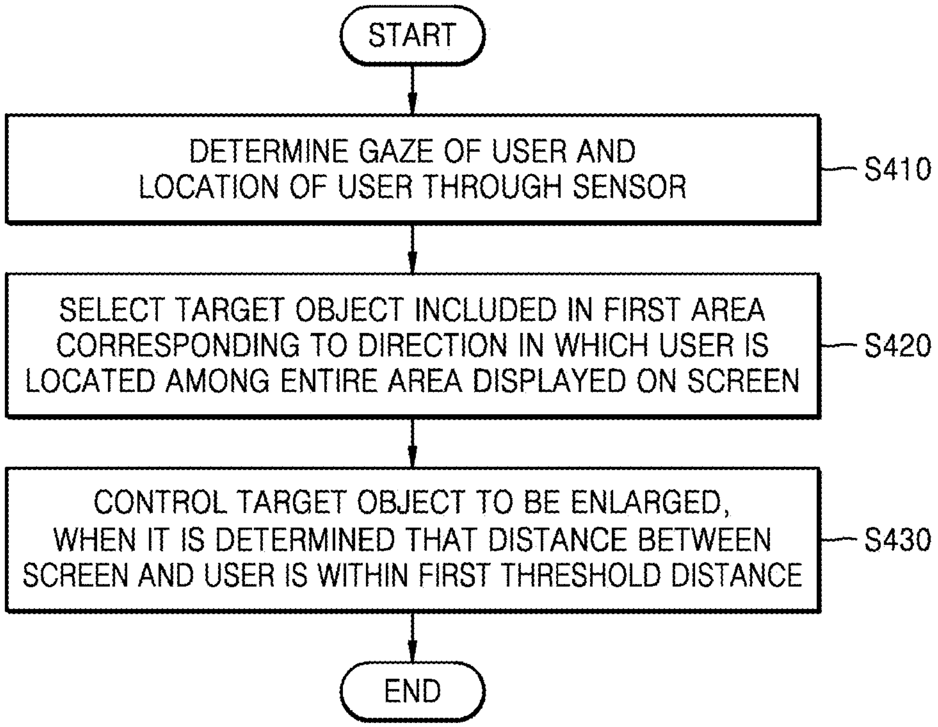
FIG. 4 illustrates a method of controlling an electronic device, according to an embodiment of the disclosure.

FIG. 4 illustrates a method of controlling an electronic device, according to an embodiment of the disclosure.

Referring to FIG. 4, in operation S410, the processor 110 according to an embodiment of the disclosure may determine a gaze of a user and a location of the user through the sensor 120. The location of the user may include a distance between the user and a screen on which an image output from the electronic device 100 is displayed and a direction of the user with respect to the electronic device 100.

In an embodiment, the processor 110 may determine whether there is a gaze change of the user through the image sensor 121. The processor 110 may determine a location of the user through the position detection sensor 122, based on the determination that there is a gaze change of the user.

In operation S420, the processor 110 according to an embodiment of the disclosure may execute one or more instructions included in the enlargement target selecting module 133 to select a target object included in a first area corresponding to a direction in which the user is located among an entire area displayed on the screen.

In an embodiment, the processor 110 may determine an area facing the gaze of the user at the location of the user as the first area of the screen. The processor 110 may select a target object included in the first area. The processor 110 may determine a coordinate value of the selected target object.

In an embodiment, the processor 110 may compare attribute values of objects stored in the memory 130 with an attribute value detected from at least one object included in the first area. When the electronic device 100 (or the processor 110) determines that at least one object matches any one of the objects stored in the memory 130, the processor 110 may select the at least one object as the target object.

In an embodiment, when the electronic device 100 (or the processor 110) determines that the user is located within a first threshold distance from the first area of the screen for a certain period of time, the processor 110 may control the target object included in the first area to be enlarged. The processor 110 may store information about the target object in the memory 130.

In an embodiment, the processor 110 may execute one or more instructions included in the enlargement history managing module 136 to update a history table including information about a distance change value between the user and the target object and a viewing time of the user for the target object, to the memory 130.

In an embodiment, the processor 110 may calculate a priority of the objects stored in the memory, based on the updated history table. The processor 110 may select a target object to be enlarged, based on the calculated priority from among objects included in the first area.

In an embodiment, when the electronic device 100 (or the processor 110) determines that the distance between the user and the first area of the screen is within the first threshold distance, the processor 110 may display a message asking the user whether to enlarge an object on the screen.

In operation S430, when the electronic device 100 (or the processor 110) determines that the distance between the screen and the user is within the first threshold distance, the processor 110 according to an embodiment of the disclosure may control the target object to be enlarged. For example, the processor 110 may execute one or more instructions included in the enlargement determining module 134 to determine whether the distance between the user and the first area of the screen is within the first threshold distance. For example, the processor 110 may execute one or more instructions included in the enlargement providing module 135 to control the target object to be enlarged.

In an embodiment, the processor 110 may display an image that is enlarged around the target object on the screen. For example, the processor 110 may display an image in a state where the user approaches the target object. Accordingly, as the user approaches the target object, the target object and a surrounding background or a surrounding object of the target object within a field of view of the user may also be enlarged. In this case, the image enlarged by the processor 110 may be displayed as a continuous image on the screen.

In an embodiment, the processor 110 may control the first area including the target object to be enlarged on a portion of the entire area of the screen. When the electronic device 100 (or the processor 110) determines that the distance between the user and the screen is within a second threshold distance shorter than the first threshold distance based on the direction in which the user is located, the processor 110 may control the first area including the target object to be enlarged on the entire area of the screen.

Figure 5:
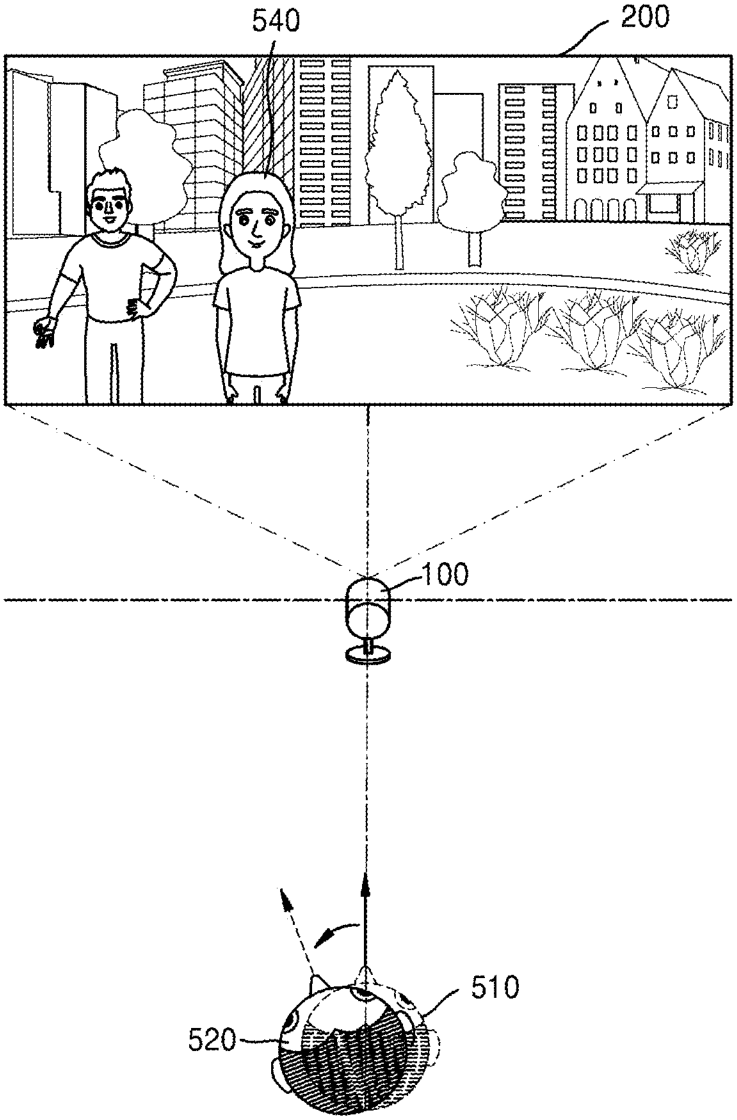
FIG. 5 illustrates a gaze change of a user with respect to an electronic device, according to an embodiment of the disclosure.

FIG. 5 illustrates a gaze change of a user with respect to an electronic device, according to an embodiment of the disclosure.

Referring to FIG. 5, the electronic device 100 according to an embodiment of the disclosure may determine whether there is a gaze change of a user through the image sensor 121. The electronic device 100 may detect a gaze change of the user by analyzing an image captured through the image sensor 121. The electronic device 100 may determine whether the changed gaze of the user is maintained for a certain period of time and may activate the position detection sensor 122. In the disclosure, the electronic device 100 may use, but is not limited to, a deep learning model trained to predict a gaze direction from an image of the user's eyes.

For example, a user 510 may look straight at the screen 200 from the center of the screen 200, and when an object 540 of interest is displayed on the screen 200, may change his/her gaze to a direction in which the object 540 is located. For example, as shown in FIG. 5, a user 520 may change his/her gaze to a left side of the screen 200 where the object 540 is located. The electronic device 100 may determine the changed gaze of the user 520 through the image sensor 121, and may determine whether the changed gaze of the user 520 is maintained for a certain period of time. For example, the electronic device 100 may activate the position detection sensor 122, when the electronic device 100 (or the processor 110) determines that the changed gaze is maintained for the certain period of time. The electronic device 100 may determine a location of the user through the activated position detection sensor 122, which will be described with reference to FIG. 6.

In the disclosure, because it is common for a user to look straight at the screen 200, a gaze direction of the user 510 before a gaze change is perpendicular to the screen 200, but the disclosure is not limited to the above embodiment. For example, even before the gaze changes, the user may not look straight at the screen 200 but may look sideways.

Figure 6:
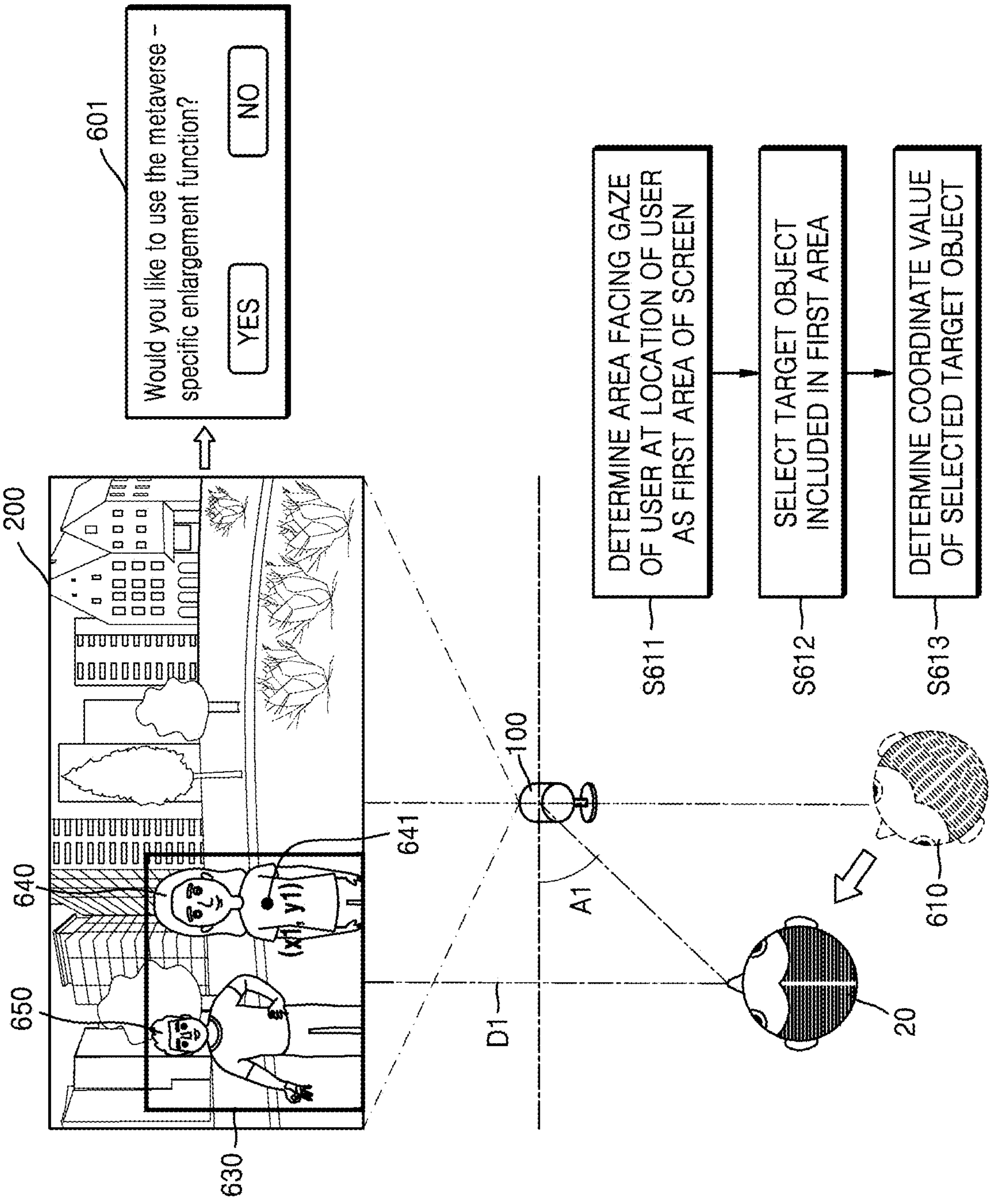
FIG. 6 illustrates a method of selecting an object according to a location change of a user with respect to an electronic device, according to an embodiment of the disclosure.

FIG. 6 illustrates a method of selecting an object according to a location change of a user with respect to an electronic device, according to an embodiment of the disclosure.

Referring to FIG. 6, the electronic device 100 according to an embodiment of the disclosure may determine a location of a user through the position detection sensor 122.

For example, a user 610 may look at a portion where an object 640 of interest (or target object 640) is located among an entire area displayed on the screen 200, and may move to look closer at the object of interest 640. For example, as shown in FIG. 6, a user 620 may move to a left side of the screen 200 where the object 640 is located. Based on determination that there is a gaze change of the user, the electronic device 100 may activate the position detection sensor 122, and may determine a location of the user 620, including a distance D1 between the screen 200 and the user 620 and a direction of the user 620 with respect to the electronic device 100 through the position detection sensor 122. For example, when the electronic device 100 is a projector display device, the electronic device 100 may determine the distance D1 between the screen 200 and the user 620, which is a sum of a first distance between the user 620 and the electronic device 100 and a second distance between the electronic device 100 and the screen 200.

The electronic device 100 according to an embodiment of the disclosure may select the target object 640 included in a first area 630 corresponding to a direction in which the user 620 is located among the entire area displayed on the screen 200. This operation of the electronic device 100 may correspond to operation S420 of FIG. 4.

In operation S611, the electronic device 100 may determine an area facing a gaze of the user 620 at the location of the user 620 as the first area 630 that is an area of interest of the screen 200. For example, the processor 110 may determine a portion of an entire area of a 3D graphic image displayed on the screen 200 corresponding to the location of the user 620 as the first area 630. For example, the first area 630 may be an area perpendicular to the gaze of the user 620 looking straight at the screen 200, based on the location of the user 620.

In an embodiment, the processor 110 may determine a portion of the entire area displayed on the screen 200 corresponding to the location of the user 620 and the gaze of the user 620 as the first area 630. Embodiments of determining the first area 630 will be described below with reference to FIG. 9.

The electronic device 100 may display a boundary line of the first area 630 through the screen 200, but the disclosure is not limited to the above embodiment. For example, the boundary line of the first area 630 may be a virtual line that is not visible to the user.

In operation S612, the electronic device 100 may select the target object 640 included in the first area 630. For example, when the first area 630, which is an area of interest, is determined, the electronic device 100 may select the target object 640 to be enlarged from among at least one object (e.g., 640 and 650) included in the first area 630. Although the at least one object (e.g., 640 and 650) includes two objects, the disclosure is not limited to the above embodiment.

In an embodiment, the electronic device 100 may select the target object 640, based on information about objects stored in the memory 130. Although the target object 640 is an avatar of the 3D graphic image, the disclosure is not limited to the above embodiment. For example, the memory 130 may include information about one or more objects included in the 3D graphic image of the screen 200. The memory 130 may include attribute values of the one or more objects, for example, an attribute value of at least one of letters, numbers, characters, and avatars. The memory 130 may include an attribute value of a user-customized object. The memory 130 may include enlargement history information of the user.

In an embodiment, the electronic device 100 may detect at least one object (e.g., 640 and 650) included in the first area 630, by using an information detection model. The electronic device 100 may detect an attribute value of the at least one object (e.g., 640 and 650). For example, the information detection model may use an optical character recognition (OCR) method, and may recognize general letters, numbers, special characters, and symbols. For example, the information detection model may include an object recognition model that recognizes objects such as characters or avatars.

In an embodiment, the electronic device 100 may compare an attribute value detected from the at least one object (e.g., 640 and 650) included in the first area 630 with attribute values of the objects stored in the memory 130. When the electronic device 100 (or the processor 110) determines that the at least one object (e.g., 640 and 650) matches any one of the stored objects, the electronic device 100 may select the at least one object (e.g., 640 and 650) as a target object, which will be described below with reference to FIGS. 10 and 11.

In an embodiment, the electronic device 100 may select the at least one object (e.g., 640 and 650) as a target object when a trigger condition is satisfied, even though the at least one object (e.g., 640 and 650) included in the first area 630 is not an object stored in the memory 130. For example, the electronic device 100 may determine how long the user is located at the same position. For example, when the electronic device 100 (or the processor 110) determines that the user 620 is located within a threshold distance for a certain period of time, the electronic device 100 may determine that the trigger condition is satisfied. Even when the at least one object (e.g., 640 and 650) does not match the objects stored in the memory 130, the electronic device 100 may determine the at least one object (e.g., 640 and 650) as an object that the user is interested in and may select the at least one object (e.g., 640 and 650) as a target object, which will be described below with reference to FIGS. 12 and 13.

In an embodiment, the electronic device 100 may include information about a priority of the objects stored in the memory 130. The electronic device 100 may determine one object considering an enlargement history of the user from among the at least one object (e.g., 640 and 650) as a target object, based on the information about the priority of the objects, which will be described below with reference to FIGS. 14 and 15.

In operation S613, the electronic device 100 may determine a coordinate value 641 of the selected target object 640. For example, the electronic device 100 may output information about key points indicating an edge of the target object 640 or coordinate values of the key points. In the disclosure, the term "coordinate value" may include plane coordinates of an object, and rotational coordinates of the object in a 3D space where a 3D shape of the object may be defined. The disclosure is not limited to the above embodiment, and the electronic device 100 may calculate various information for determining a location or a direction of the target object 640 in the first area 630.

The electronic device 100 according to an embodiment of the disclosure may output a message regarding whether to enlarge an object through the screen 200. For example, the electronic device 100 may display a user interface screen 601 saying "Would you like to use the metaverse-specific enlargement function?" on the screen 200. When the electronic device 100 receives a user input for "Yes", the electronic device 100 may control the target object 640 to be enlarged. However, the disclosure is not limited to the above embodiment, and the electronic device may control the target object 640 to be automatically enlarged without a separate user interface screen. In another example, the electronic device 100 may output a message regarding whether to enlarge an object before selecting the target object 640.

Figure 7:
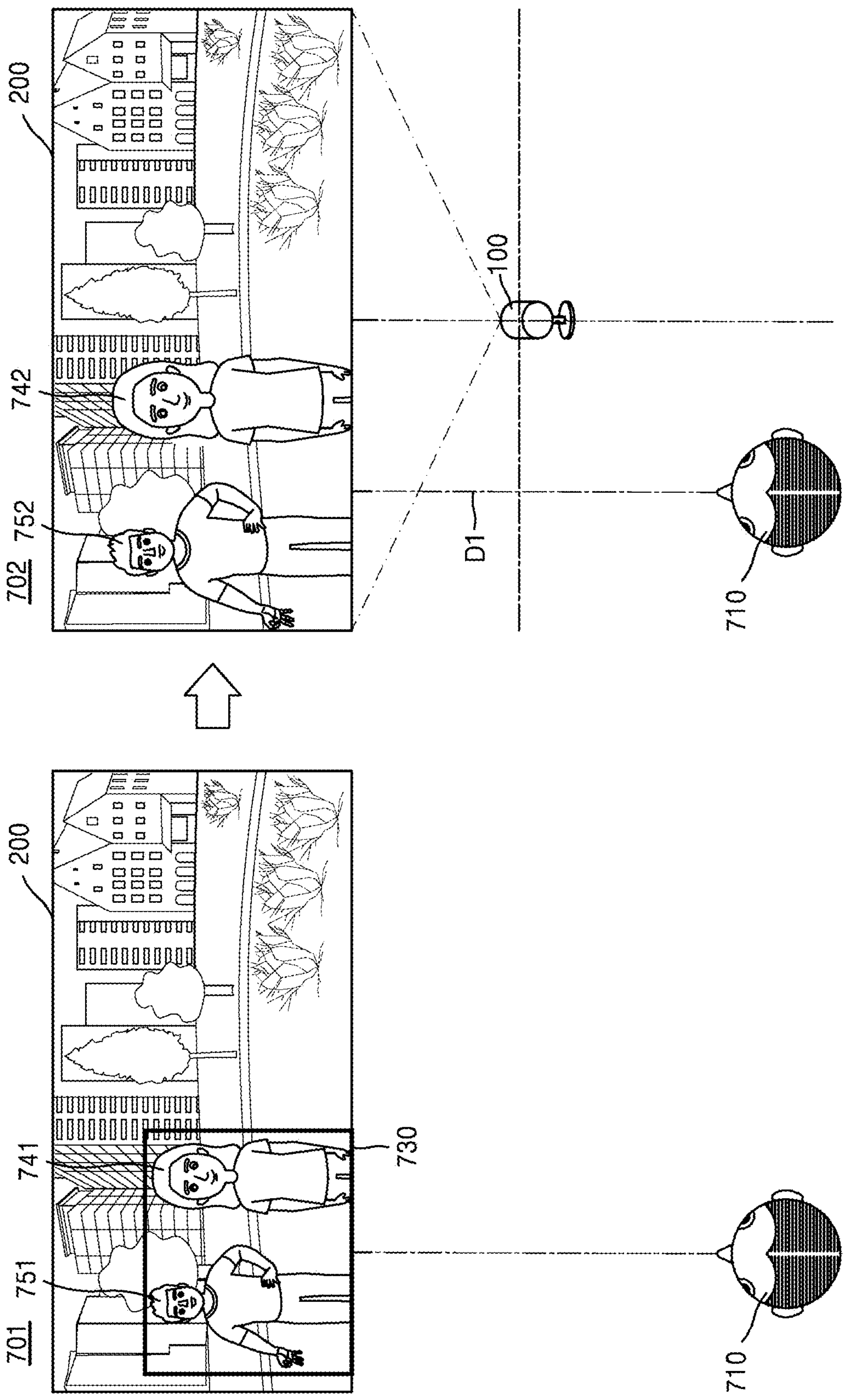
FIG. 7 illustrates a method by which an electronic device enlarges an object, according to an embodiment of the disclosure.

FIG. 7 illustrates a method by which an electronic device enlarges an object, according to an embodiment of the disclosure.

Referring to FIG. 7, a state before enlargement 701 and a state after enlargement 702 are illustrated.

In the enlargement 701 of FIG. 7, the electronic device 100 may select a target object 741 from among at least one object (e.g., 741 and 751) displayed on the screen 200 as a target to be enlarged. The electronic device 100 may determine whether a distance D1 between the screen 200 and a user 710 is within a first threshold distance through a position detection sensor.

In the enlargement 702 of FIG. 7, when the electronic device 100 (or the processor 110) determines that the distance D1 between the screen 200 and the user 710 is within the first threshold distance, the electronic device 100 may control a target object 742 to be enlarged. The electronic device 100 may display a 3D graphic image including an enlarged target object 742 on the screen 200.

In an embodiment, the electronic device 100 may display an image that is enlarged around the target object 742 on the screen 200. For example, the electronic device 100 may enlarge the target object 742 as if a camera photographing the target object 742 is approaching the target object 742. Accordingly, as the user 710 approaches the target object 742, the target object 742 may be enlarged and enter a field of view of the user 710. In an embodiment, as the target object 742 is enlarged, another object 752 adjacent to the target object 742 may also be enlarged. In this case, the electronic device 100 may continuously display the target object 742 with a background image (e.g., a tree background).

In an embodiment, a plurality of objects (e.g., 741 and 751) may be included in a first area 730 determined by the electronic device 100. The electronic device 100 may control the plurality of objects (e.g., 741 and 751) to be enlarged, based on determination that each of the plurality of objects (e.g., 741 and 751) matches objects stored in the memory 130. In another embodiment, when only one object 741 from among the plurality of objects (e.g., 741 and 751) matches the objects stored in the memory 130, the electronic device 100 may control only the one object 741 to be enlarged.

Because the electronic device 100 according to an embodiment of the disclosure displays 3D graphic images of objects and each of the objects includes an attribute value, the electronic device 100 may control each object that the user is interested in to be enlarged. The electronic device 100 may implement immersive content by enlarging an object displayed on the screen 200.

The electronic device 100 according to an embodiment of the disclosure may perform various operations in addition to an operation of enlarging a target object. The electronic device 100 according to an embodiment may perform an operation of automatically enlarging letters for a user who has a history of enlarging small letters. For example, when the electronic device 100 (or the processor 110) determines that the user's eyesight is low, the electronic device 100 may automatically enlarge letters in content with subtitles, such as news.

Also, the electronic device 100 according to an embodiment may enlarge a target object and may also provide additional information about the target object. For example, for an object with historical information such as a pyramid, the electronic device 100 may provide a YouTube link about the historical information while enlarging the object.

Figure 8:
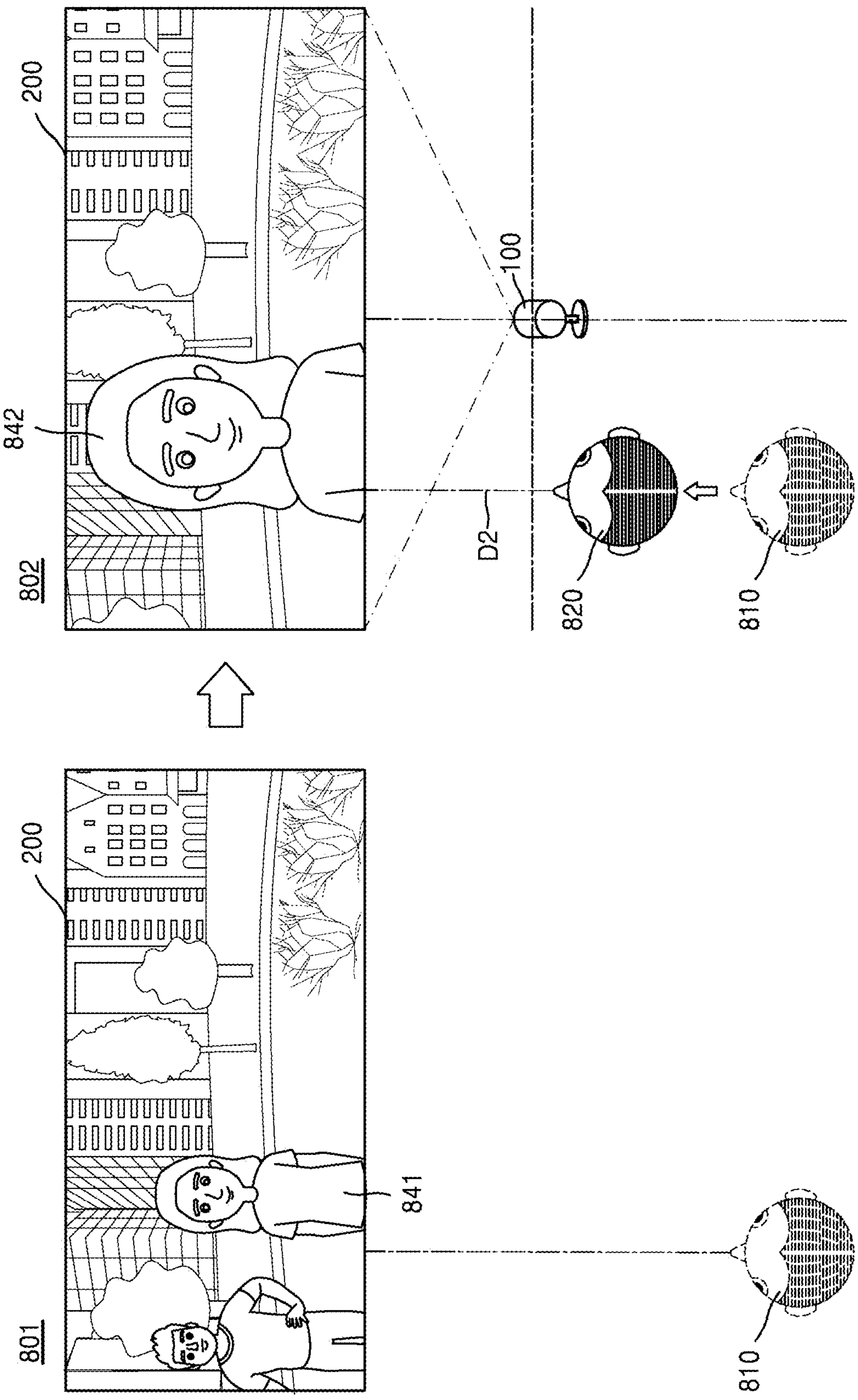
FIG. 8 illustrates a method of enlarging an object according to a location change of a user with respect to an electronic device, according to an embodiment of the disclosure.

FIG. 8 illustrates a method of enlarging an object according to a location change of a user with respect to an electronic device, according to an embodiment of the disclosure.

Referring to FIG. 8, a state after enlargement 801 and a state after additional enlargement 802 are illustrated.

In the enlargement 801 of FIG. 8, when the electronic device 100 (or the processor 110) determines that a distance D1 between the screen 200 and a user 810 is within a first threshold distance, the electronic device 100 may display an enlarged target object 841 on the screen 200.

In the enlargement 802 of FIG. 8, when the electronic device 100 (or the processor 110) determines that a distance D2 between the screen 200 and a user 820 is within a second threshold distance, the electronic device 100 may display a further enlarged target object 842 on the screen 200. The second threshold distance may be shorter than the first threshold distance. The electronic device 100 may determine whether the user 820 moves closer to the screen 200, and when the electronic device 100 (or the processor 110) determines that the distance D2 between the screen 200 and the user 820 is within the second threshold distance, the electronic device 100 may control the target object 842 to be further enlarged.

Figure 9:
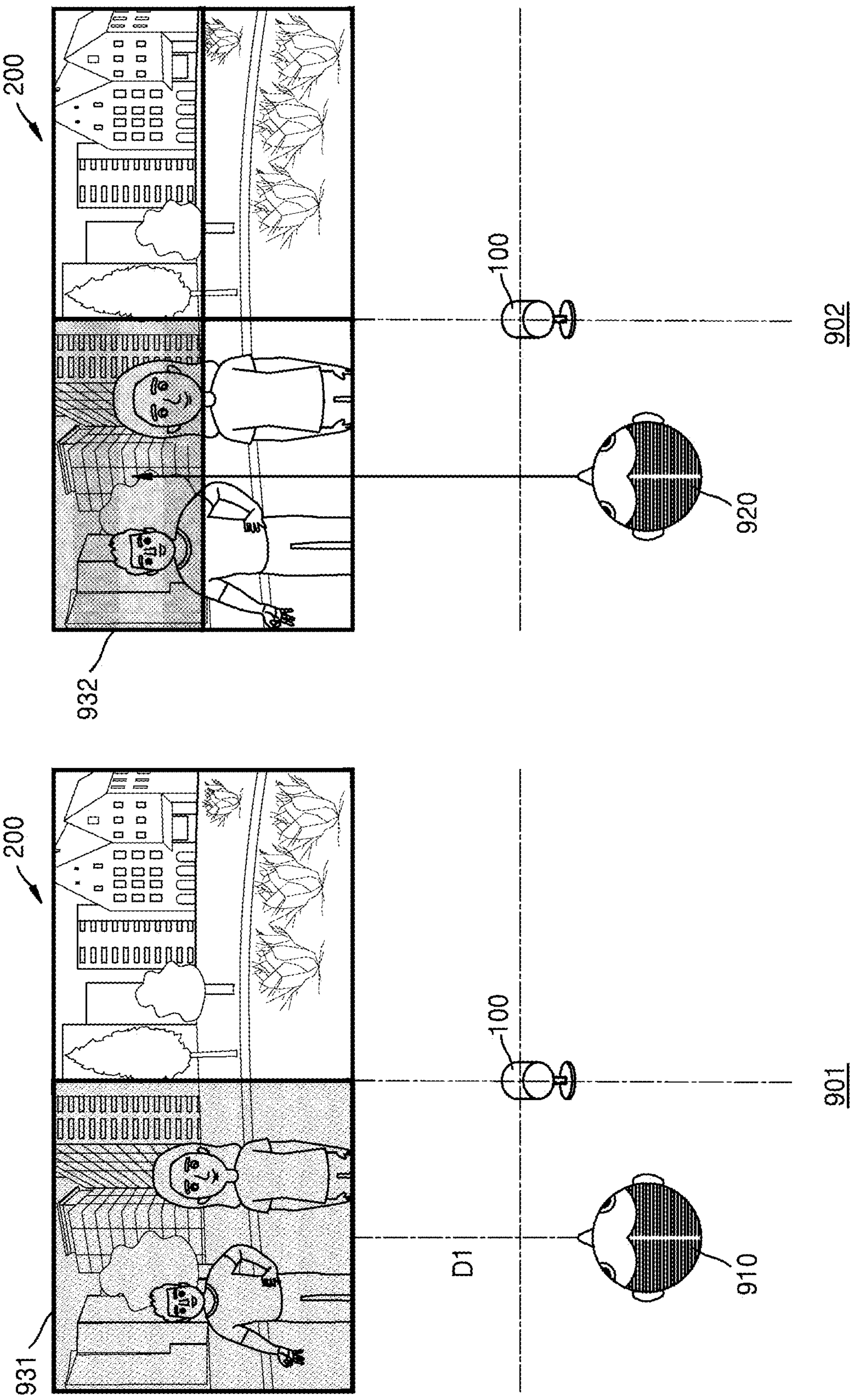
FIG. 9 illustrates a method by which an electronic device determines a first area, according to an embodiment of the disclosure.

FIG. 9 illustrates a method by which an electronic device determines a first area, according to an embodiment of the disclosure.

A method by which the processor 110 of the electronic device 100 according to embodiments determines a first area will be described with reference to a first case 901 and a second case 902 of FIG. 9.

Referring to the first case 901 of FIG. 9, the processor 110 may determine a portion of an entire area of a 3D graphic image displayed on the screen 200 corresponding to a location of a user 910 as a first area 930.

For example, the processor 110 may determine whether a direction in which the user is located is a left side or a right side of the electronic device 100, and may divide an entire area of the screen 200 into two areas, that is, a left area and a right area. For example, when the electronic device 100 (or the processor 110) determines that the user 910 is on the left side of the electronic device 100, the processor 110 may determine the left area among the entire area of the screen 200 as a first area 931.

However, the disclosure is not limited to the above embodiment, and the processor 110 may divide the entire area of the screen 200 into n areas from a left area to a right area (n is a natural number of 3 or more) based on the electronic device 100.

Referring to the second case 902 of FIG. 9, the processor 110 may determine a portion of an entire area displayed on the screen 200 corresponding to a location of a user 920 and a gaze of the user 920 as a first area. For example, the processor 110 may determine whether a direction in which the user is located is a left side or a right side of the electronic device 100 and may determine whether a gaze of the user is upward or downward. The processor 110 may divide the entire area of the screen 200 into four quadrants. For example, the processor 110 may determine that the user 920 is located on the left side of the electronic device 100 and may determine that a gaze of the user 920 is upward. Accordingly, the processor 110 may determine a first quadrant area among the entire area of the screen 200 as a first area 932.

A method by which the electronic device 100 according to an embodiment of the disclosure determines a first area is not limited to the above example. For example, the processor 110 may determine an arbitrary area corresponding to a location of the user and a gaze of the user as a first area.

Hereinafter, a method by which the electronic device 100 according to embodiments selects a target object will be described with reference to FIGS. 10 to 15.

Figure 10:
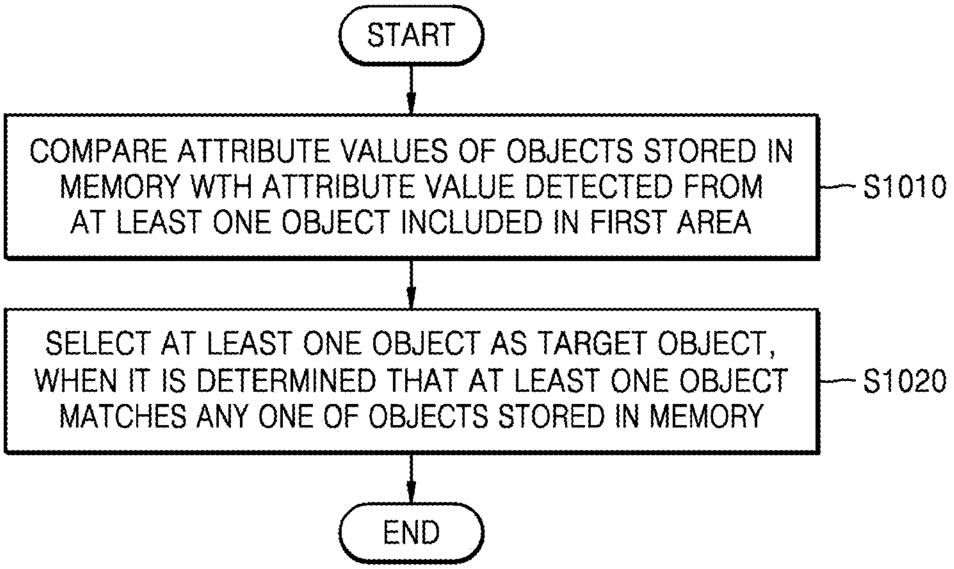
FIG. 10 illustrates a method by which an electronic device selects an object, according to an embodiment of the disclosure.
Figure 11:
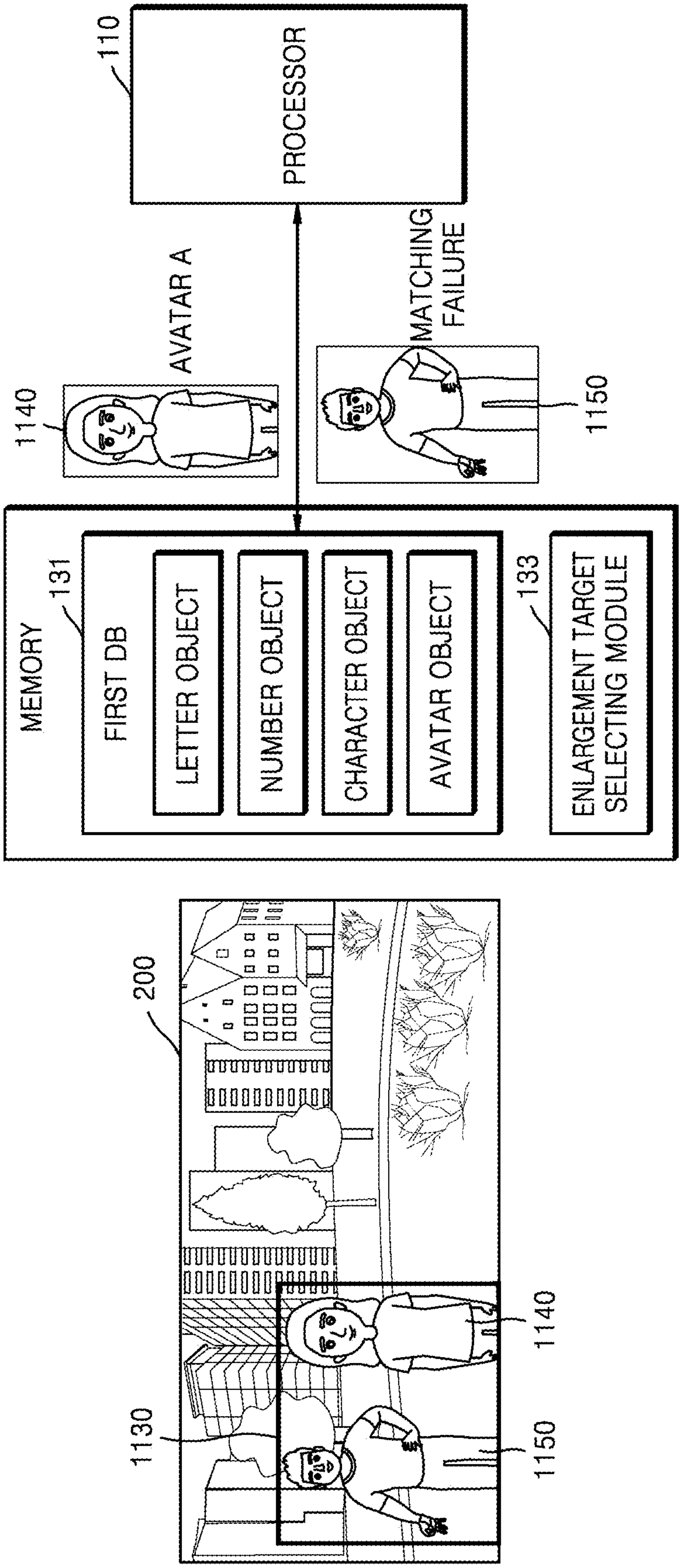
FIG. 11 illustrates the method of selecting an object of FIG. 10.

FIG. 10 illustrates a method by which an electronic device selects an object, according to an embodiment of the disclosure. FIG. 11 illustrates the method of selecting an object of FIG. 10.

Referring to FIGS. 10 and 11, the processor 110 according to an embodiment may execute one or more instructions included in the enlargement target selecting module 133 to select a target object based on information about objects stored in the first DB 131.

Referring to FIG. 10, in operation S1010, the processor 1010 may compare attribute values of objects stored in the memory 130 with an attribute value detected from at least one object included in a first area.

Referring to FIG. 11, in an embodiment, the processor 110 may detect at least one object (e.g., 1140 and 1150) included in a first area 1130 of the screen 200 through an information detection model. The processor 110 may detect an attribute value of the at least one object (e.g., 1140 and 1150) through the information detection model. The information detection model may detect information about objects such as general letters, numbers, special characters, symbols, characters, and avatars in the first area 1130. For example, the information detection model may include, but is not limited to, optical letter recognition (OCR).

In an embodiment, the memory 130 may include the first DB 131 in which information about at least one object included in a 3D graphic image of the screen 200 is stored. The first DB 131 may include an attribute value of at least one of a letter object, a number object, a character object, and an avatar object.

In an embodiment, the processor 110 may compare attribute values of objects stored in the first DB 131 with an attribute value detected from the at least one object (e.g., 1140 and 1150). For example, the processor 110 may compare the attribute values of the objects stored in the first DB 131 with an attribute value of a first object 1140. The processor 110 may compare the attribute values of the objects stored in the first DB 131 with an attribute value of a second object 1150.

In operation S1020, when the electronic device 100 (or the processor 110) determines that the at least one object (e.g., 1140 and 1150) included in the first area 1130 matches any one of the objects stored in the memory 130, the processor 110 may select the at least one object as a target object.

Referring to FIG. 11, in an embodiment, the first DB 131 may include information indicating that the first object 1140 is 'Avatar A', and may include an attribute value of 'Avatar A'. The processor 110 may compare the attribute value of 'Avatar A' stored in the first DB 131 with an attribute value of the first object 1140 detected in the first area 1130, and when the electronic device 100 (or the processor 110) determines that the attribute values match each other, the processor 110 may recognize the first object 1140 as 'Avatar A' and may select the first object 1140 as a target object.

Also, in an embodiment, the first DB 131 may not include information about the second object 1150. When the electronic device 100 (or the processor 110) determines that the objects included in the first DB 131 do not match the second object 1150 detected in the first area 1130, the processor 110 may not select the second object 1150 as a target object.

In an embodiment of the disclosure, the electronic device 100 may compare an attribute value of each of the first object 1140 and the second object 1150 with attribute values of the objects stored in the memory 130, and when the electronic device 100 (or the processor 110) determines that the first object 1140 matches any one of the objects stored in the memory 130, the electronic device 100 may select the first object 1140 as a target object 1140.

Figure 12:
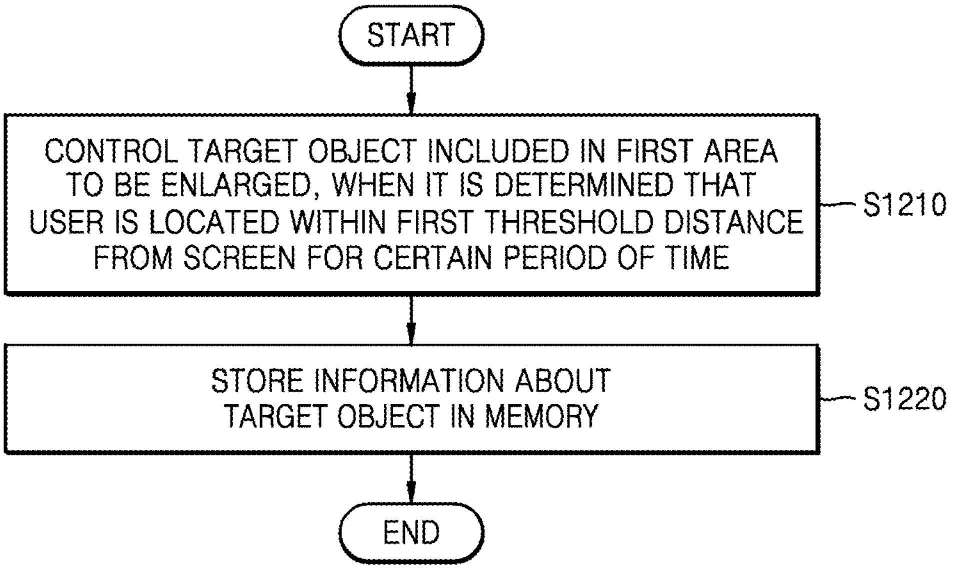
FIG. 12 illustrates a method by which an electronic device selects an object, according to an embodiment of the disclosure.
Figure 13:
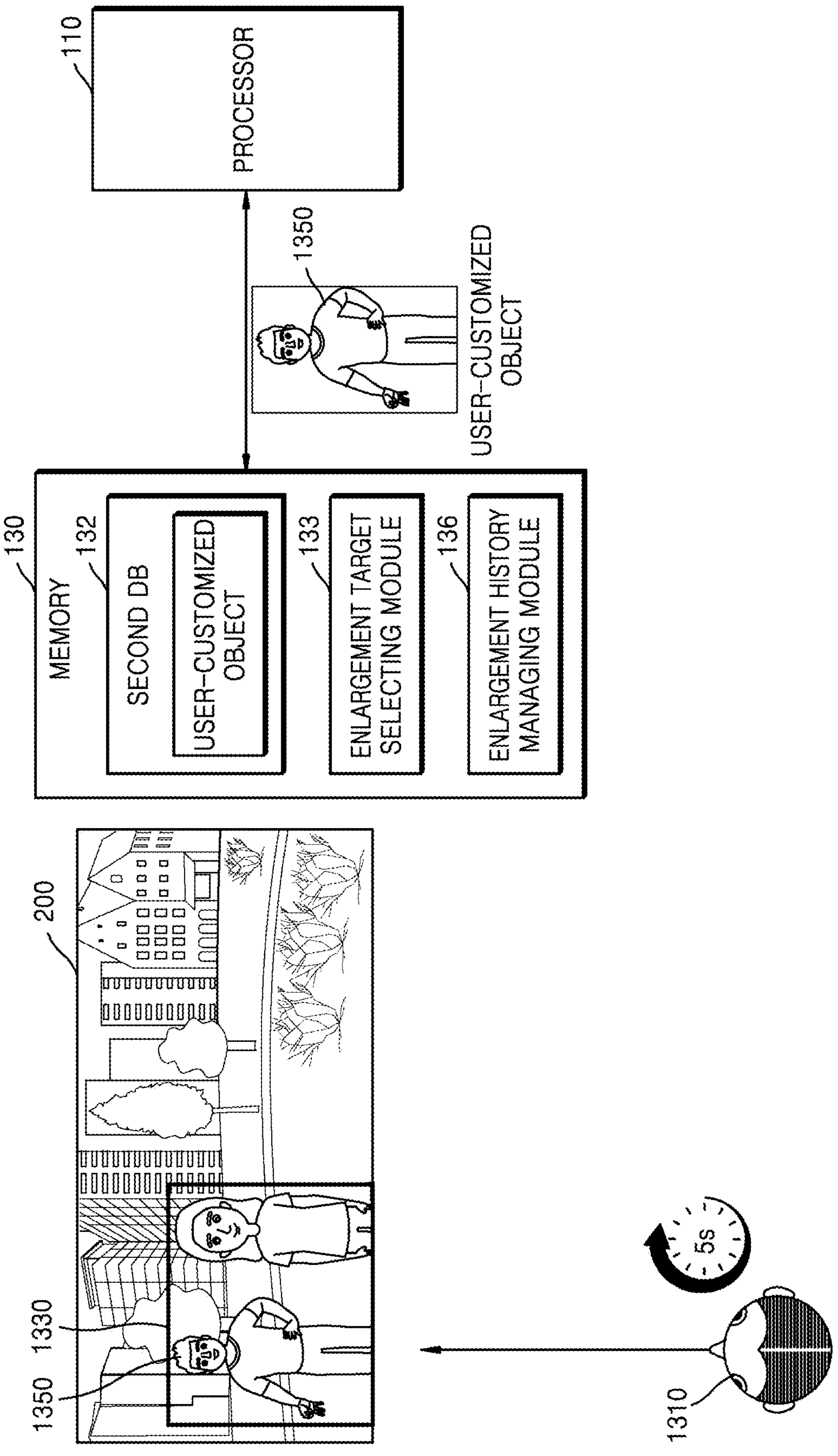
FIG. 13 illustrates the method of selecting an object of FIG. 12.

FIG. 12 illustrates a method by which an electronic device selects an object, according to an embodiment of the disclosure. FIG. 13 illustrates the method of selecting an object of FIG. 12.

Referring to FIGS. 12 and 13, the processor 110 according to an embodiment may execute one or more instructions included in the enlargement target selecting module 133 to select a user-customized object, and may execute one or more instructions stored in the enlargement history managing module 136 to store the user-customized object in the second DB 132. The user-customized object is an object not stored in the first DB 131 that is the preset memory 130, and may be an object that has a history of being enlarged by a user.

Referring to FIG. 12, in operation S1210, when a trigger condition is satisfied, the processor 110 may select a user-customized object. For example, when the electronic device 100 (or the processor 110) determines that the user is located within a first threshold distance from a screen for a certain period of time, the processor 110 may control a target object included in a first area to be enlarged.

In an embodiment, the trigger condition may be a distance between the user and the screen 200 and a viewing time of the user. For example, when the electronic device 100 (or the processor 110) determines that a user 1310 is located with a first threshold distance from the screen 200 and is watching a first area 1330 for a certain period of time (e.g., 5 seconds), the processor 110 may determine that the trigger condition is satisfied. The processor 110 may select an object 1350 included in the first area 1330 as a target object.

In an embodiment, even when information about the object 1350 included in the first area 1330 does not match objects stored in the first DB 131, the processor 110 may recognize that the object 1350 is a user-customized object that the user wants to enlarge. The processor 110 may control the object 1350, which is a user-customized object, to be enlarged.

In operation S1220, the processor 110 may store information about the target object in the memory 130. The processor 110 may update an object that has a history of being enlarged by the user, to the memory 130.

Referring to FIG. 13, in an embodiment, the memory 130 may include the second DB 132 in which information about a user-customized object is stored. The second DB 132 may execute one or more instructions included in the enlargement history managing module 136 to store an object that has a history of being enlarged by a user. The second DB 132 may include an attribute value of the stored user-customized object.

In an embodiment, when the processor 110 stores the information about the user-customized object in the second DB 132, the user-customized object displayed in a first area may be selected as a target object as shown in FIG. 10. For example, the processor 110 may compare attribute values of user-customized objects stored in the second DB 132 with an attribute value detected from at least one object included in the first area. When the electronic device 100 (or the processor 110) determines that the at least one object included in the first area matches any one of the user-customized objects stored in the second DB 132, the processor 110 may select the at least one object as a target object.

Figure 14:
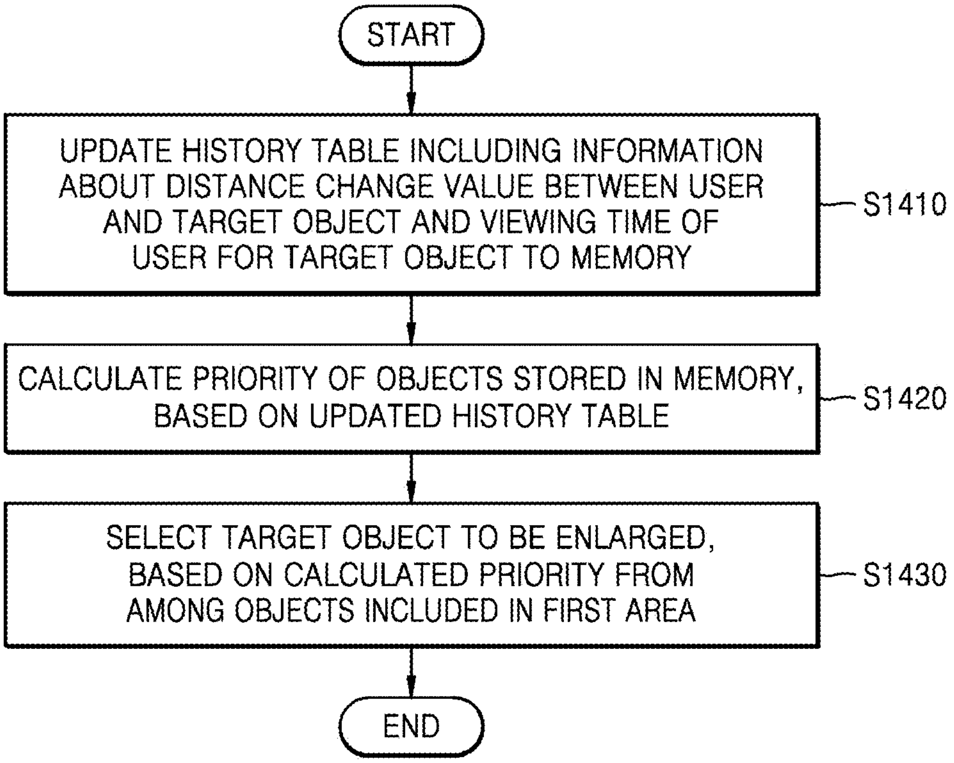
FIG. 14 illustrates a method by which an electronic device selects an object, according to an embodiment of the disclosure.
Figure 15:
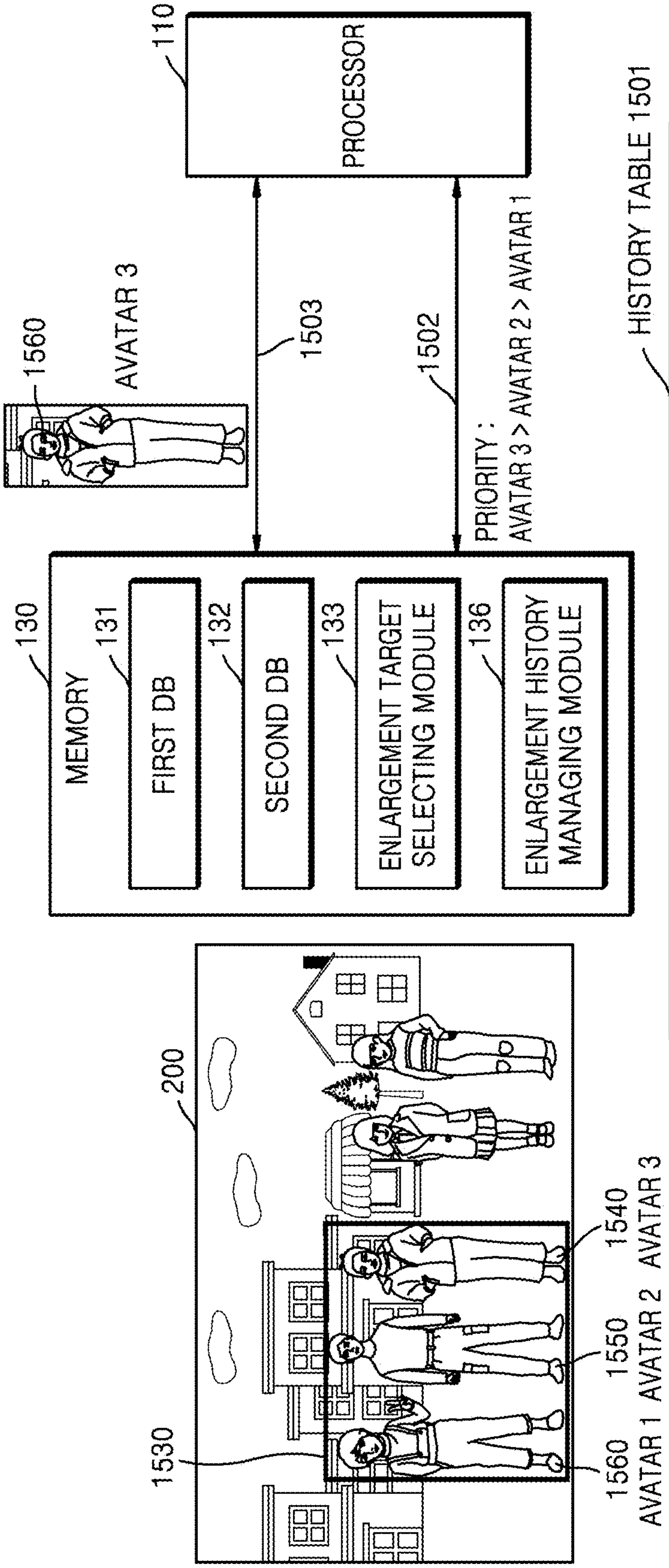
FIG. 15 illustrates the method of selecting an object of FIG. 14.

FIG. 14 illustrates a method by which an electronic device selects an object, according to an embodiment of the disclosure. FIG. 15 illustrates the method of selecting an object of FIG. 14.

Referring to FIGS. 14 and 15, the processor 110 according to an embodiment may execute one or more instructions included in the enlargement history managing module 136 to calculate a priority of objects (e.g., 1540, 1550, and 1560) included in a first area 1530, and may execute one or more instructions included in the enlargement target selecting module 133 to select a target object 1540 based on the priority.

Referring to FIG. 14, in operation S1410, the processor 110 may update a history table including information about a distance change value between a user and a target object and a viewing time of the user for the target object, to the first DB 131 or the second DB 132.

Referring to FIG. 15, in an embodiment, the processor 110 may detect attribute values of objects displayed on the screen 200. For example, the first area 1530 displayed on the screen 200 may include a first object 1540, a second object 1550, and a third object 1560. The processor 110 may recognize the first object 1540 as 'Avatar 1', may recognize the second object 1550 as 'Avatar 2', and may recognize the third object 1560 as 'Avatar 3', based on the attribute values stored in the memory 130. An object detection method has been described with reference to FIGS. 10 and 11, and thus, will be briefly described.

In an embodiment, the processor 110 may obtain a history table 1501 in which a value obtained by multiplying a distance change between the screen 200 including objects and a user by a viewing time of the user for each object is defined as a 'score', based on an enlargement history of the user. For example, the processor 110 may obtain the history table 1501 in which a score is assigned to each of Avatar 1, Avatar 2, and Avatar 3, based on an enlargement history of the user for each of Avatar 1, Avatar 2, and Avatar 3.

In detail, referring to the history table 1501, the processor 110 may assign 3 points to Avatar 1 through a history that the user moved 1 m to watch Avatar 1 and watched Avatar 1 for 3 seconds. Also, the processor 110 may assign 5 points to Avatar 2 through a history that the user moved 0.5 m to watch Avatar 2 and watched Avatar 2 for 10 seconds. Also, the processor 110 may assign 6 points to Avatar 3 through a history that the user moved 1.5 m to watch Avatar 3 and watched Avatar 3 for 4 seconds.

In an embodiment, the processor 110 may update the history table 1501 to the first DB 131 and the second DB 132. For example, when the processor 110 obtains a score for an object (e.g., avatar) stored in the first DB 131 in the history table 1501, the processor 110 may update the score to the first DB 131. For example, when the processor 110 obtains a score for an object (e.g., a user-customized object) stored in the second DB 132 in the history table 1501, the processor 110 may update the score to the second DB 132.

In operation S1420, the processor 110 may calculate a priority of objects stored in the memory, based on the updated history table. For example, the processor 110 may calculate information about the priority (e.g., Avatar 3>Avatar 2>Avatar 1) 1502, based on the obtained history table 1501.

In operation S1430, the processor 110 may select a target object to be enlarged, based on the calculated priority from among objects included in a first area. For example, the processor 110 may select the first object 1540 recognized as 'Avatar 3' 1503 as a target object based on the calculated priority from among the objects (e.g., 1540, 1550, and 1560) included in the first area 1530.

A method by which the electronic device 100 according to an embodiment of the disclosure selects a target object is not limited to the above example. For example, the processor 110 may obtain an automatic enlargement recommendation function, by executing a learning and modeling model. For example, when the first object 1540 appears, if the user has a history of frequently coming close and watching the first object 1540 for a long time, the processor 110 may automatically suggest whether to enlarge the first object 1540 even when there is no change in a gaze and a distance value of the user.

Hereinafter, another method by which an electronic device according to an embodiment enlarges an object will be described with reference to FIGS. 16, 17A, and 17B.

Figure 16:
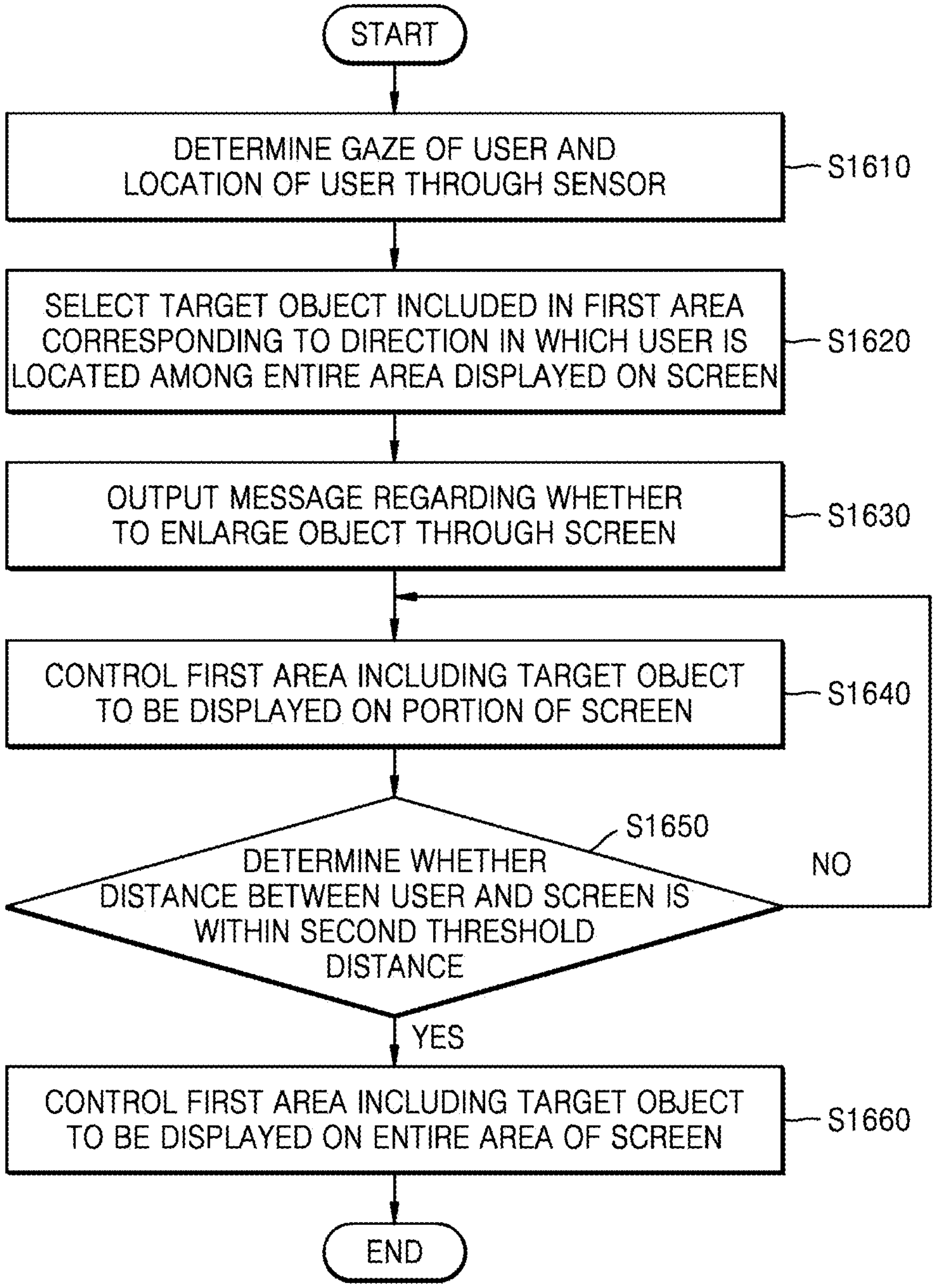
FIG. 16 illustrates a method by which an electronic device enlarges an object, according to an embodiment of the disclosure.

FIG. 16 illustrates a method by which an electronic device enlarges an object, according to an embodiment of the disclosure. FIG. 17A illustrates a method by which an electronic device partially enlarges an object, according to an embodiment of the disclosure. FIG. 17B illustrates a method by which an electronic device completely enlarges an object, according to an embodiment of the disclosure.

Referring to FIG. 16, in operation S1610, the processor 110 may determine a gaze of a user and a location of the user through the sensor 120. Operation S1610 may correspond to operation S410 of FIG. 4. 1701 of FIG. 17A shows a state before the electronic device 100 enlarges an image displayed on the screen 200.

In operation S1620, the processor 110 may select a target object included in a first area corresponding to a direction in which the user is located among an entire area displayed on the screen 200. Operation S1620 may correspond to operation S420 of FIG. 4. For example, in 1701 of FIG. 17A, the processor 110 may select a target object included in a first area 1731 corresponding to a direction in which a user 1710 is located among an entire area displayed on the screen 200. The remaining area 1741 may refer to the rest of the entire area displayed on the screen 200 except for the first area 1731.

In operation S1630, the processor 110 may output a message regarding whether to enlarge an object through the screen 200. Operation S1630 corresponds to the user interface screen 601 of FIG. 6, and thus, a description thereof will be omitted. Operation S1630 may be omitted. For example, the processor 110 may control to automatically enlarge an object, without outputting a message regarding whether to enlarge an object.

Figure 17A:
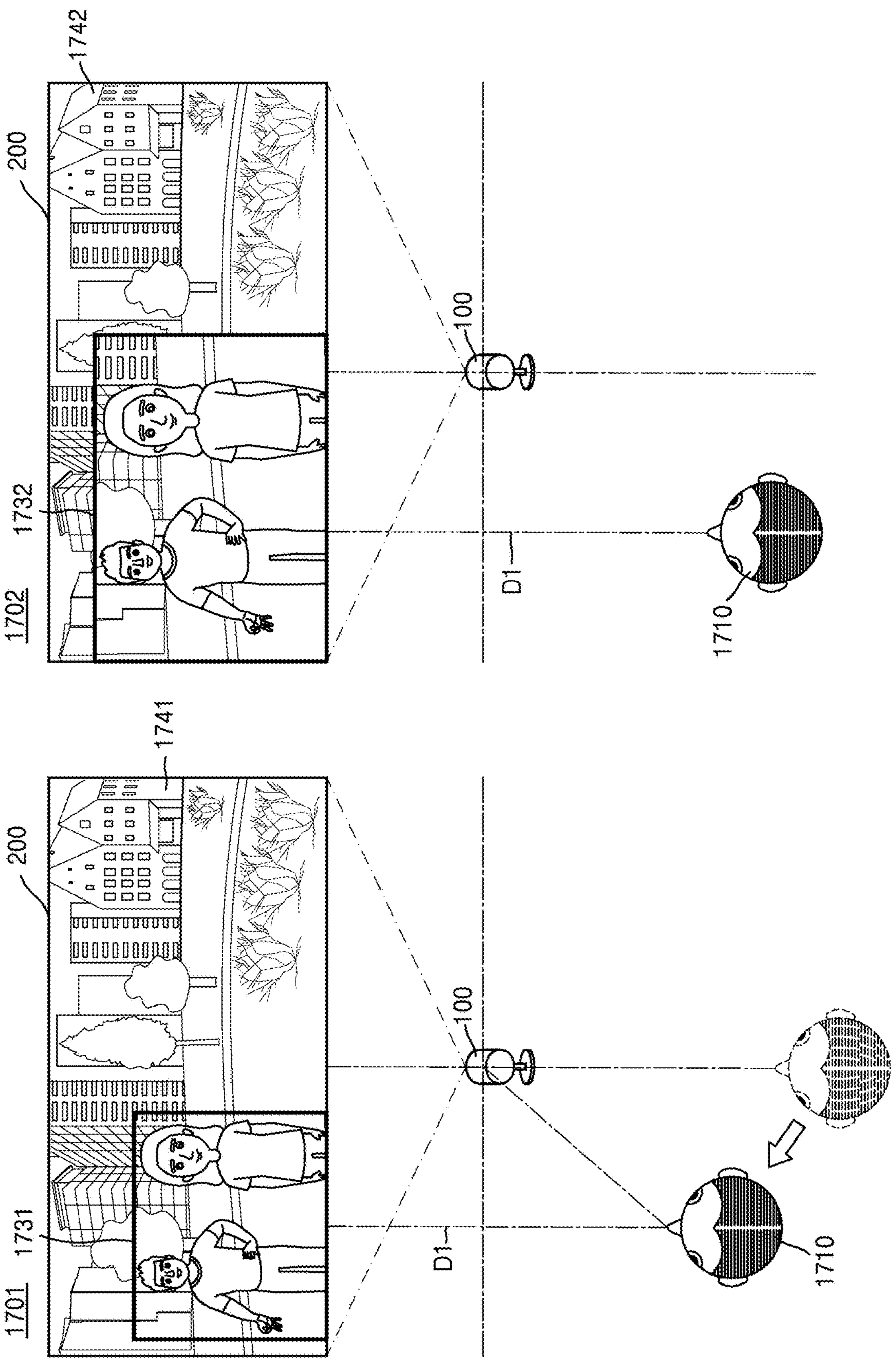
FIG. 17A illustrates a method by which an electronic device partially enlarges an object, according to an embodiment of the disclosure.

In operation S1640, the processor 110 may control the first area including the target object to be displayed on a portion of the screen. 1702 of FIG. 17A shows a state where the electronic device 100 enlarges the first area 1731 displayed on the screen 200 and displays the enlarged first area 1731 on a portion 1732.

In an embodiment, when the electronic device 100 (or the processor 110) determines that a distance D1 between the user 1710 and the screen 200 is within a first threshold distance, the processor 110 may control the first area 1731 to be enlarged on the portion 1732. In this case, the electronic device 100 may enlarge and display the first display 1731 by the portion 1732 and may not enlarge the remaining area 1741. In this case, the remaining portion 1742 displayed in the state 1702 after partial enlargement may be smaller than the remaining area 1741 displayed in the state before enlargement 1701.

In operation S1650, the processor 110 may determine whether the distance D2 between the user 1720 and the screen 200 is within a second threshold distance. When the electronic device 100 (or the processor 110) determines that a distance D2 between the user 1720 and the screen 200 is within a second threshold distance, the processor 110 may perform operation S1660. When the electronic device 100 (or the processor 110) determines that the distance D2 between the user 1720 and the screen 200 is greater than the second threshold distance, the processor 110 may perform operation S1640.

Figure 17B:
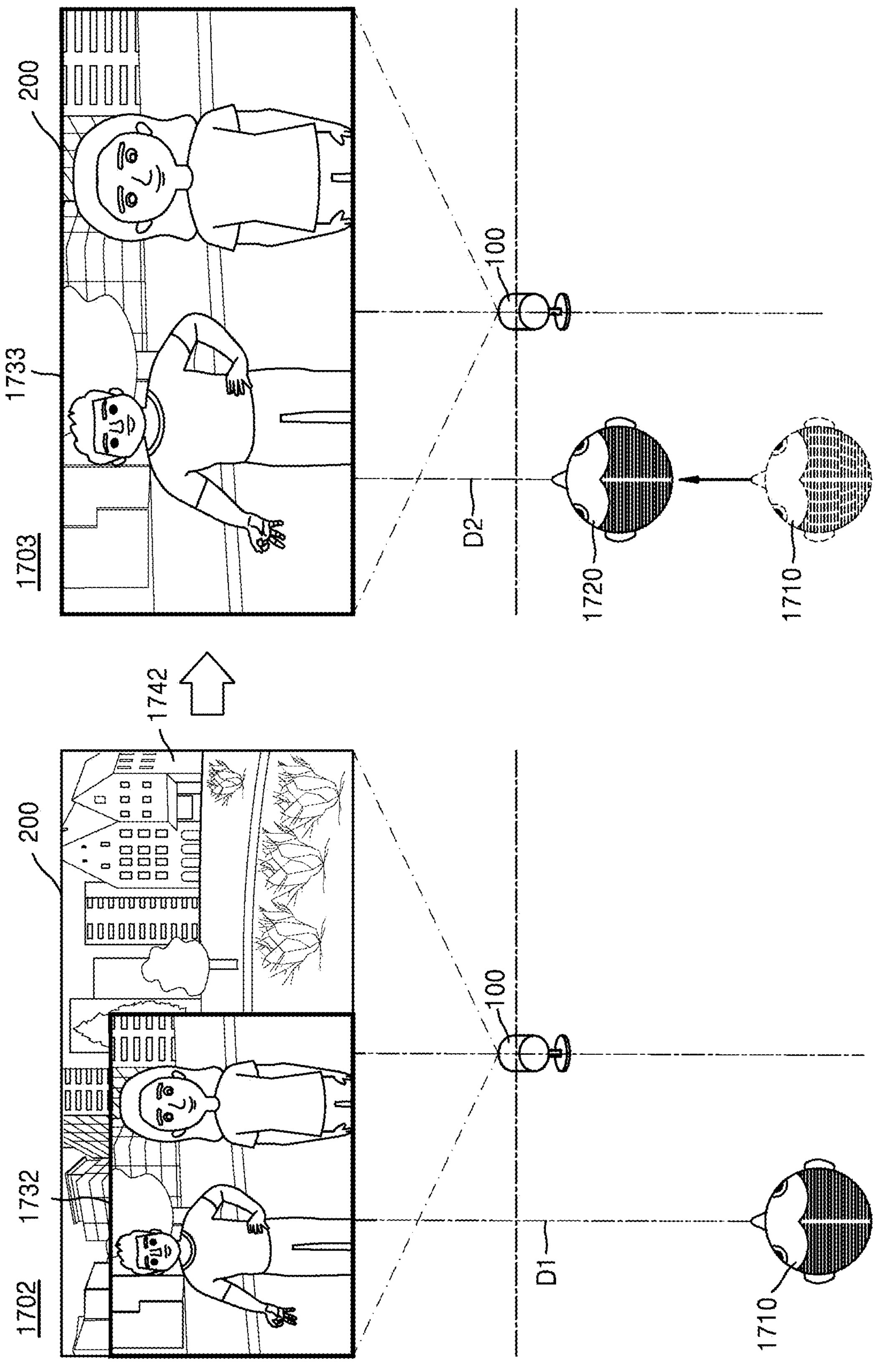
FIG. 17B illustrates a method by which an electronic device completely enlarges an object, according to an embodiment of the disclosure.

In operation S1660, the processor 110 may control the first area 1731 including the target object to be displayed on an entire area 1733 of the screen 200. 1703 of FIG. 17B shows a state where the electronic device 100 enlarges the first area 1731 displayed on the screen 200 and displays the enlarged first area 1731 on the entire area 1733.

Figure 18:
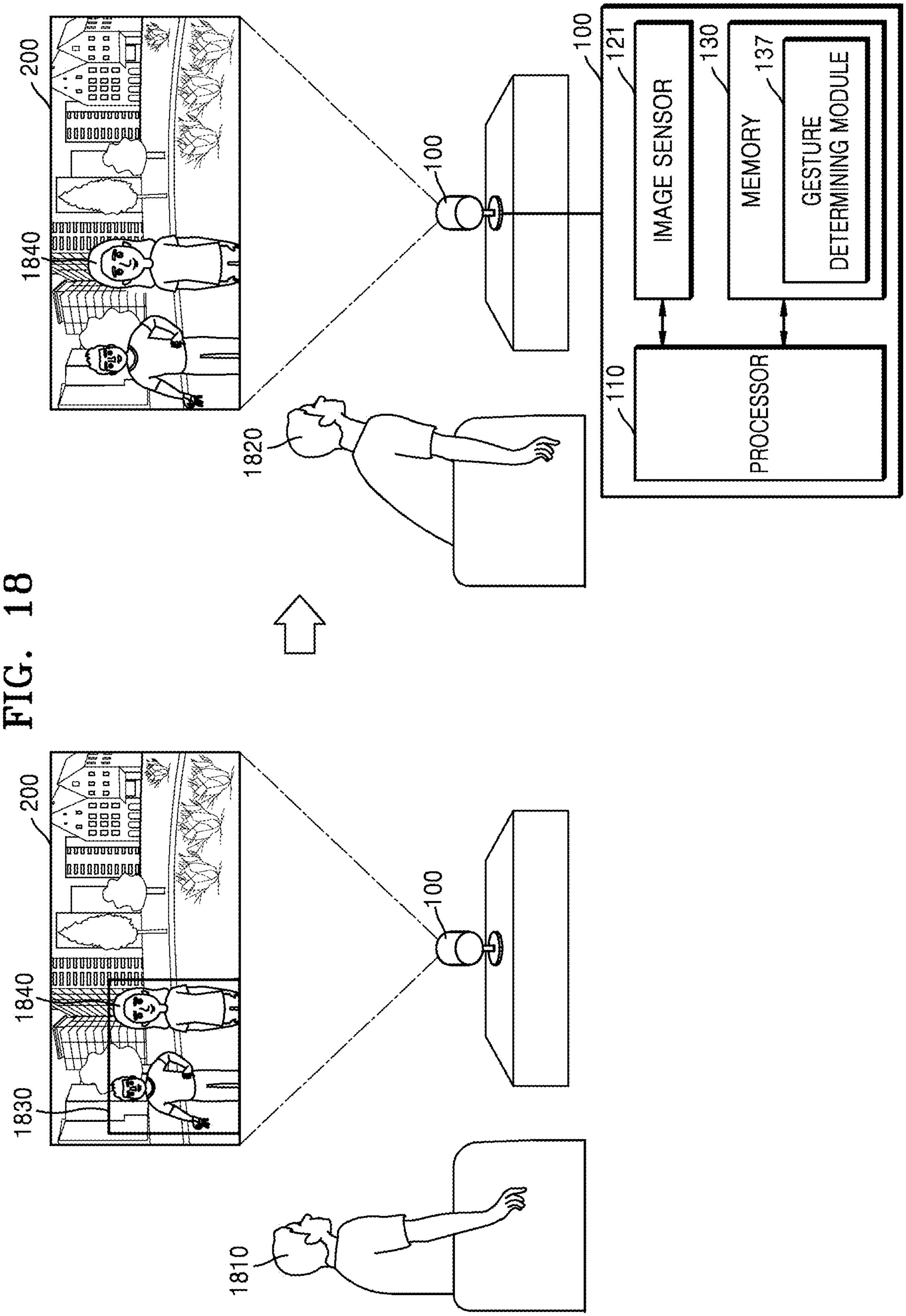
FIG. 18 illustrates a method of enlarging an object according to a gesture change of a user with respect to an electronic device, according to an embodiment of the disclosure.

FIG. 18 illustrates a method of enlarging an object according to a gesture change of a user with respect to an electronic device, according to an embodiment of the disclosure.

Referring to FIG. 18, in an embodiment of the disclosure, the memory 130 may store a gesture determining module 137. At least one instruction included in the gesture determining module 137 may be executed by the processor 110.

In an embodiment, the processor 110 may execute the at least one instruction included in the gesture determining module 137 to determine a gesture of a user obtained through a camera of the image sensor 121. The processor 110 may select a target object 1840 included in a first area 1830 through the determined gesture of the user.

For example, the image sensor 121 may receive an image of the user through the camera, and the image of the user captured through the image sensor 121 may be processed through the processor 110.

For example, the image sensor 121 may receive an image including a gesture of a user (e.g., 1810 or 1820) leaning forward and watching the first area 1830 closely. The processor 110 may execute one or more instructions included in the gesture determining module 137 to select the first area 1830 and the target object 1840 through the gesture of the user, and may control the target object 1840 included in the first area 1830 to be enlarged.

In the disclosure, the gesture of the user may include not only a motion of leaning the upper body forward but also all hand gestures, foot gestures, body gestures, etc. of the user who wants to enlarge and watch an image.

Figure 19:
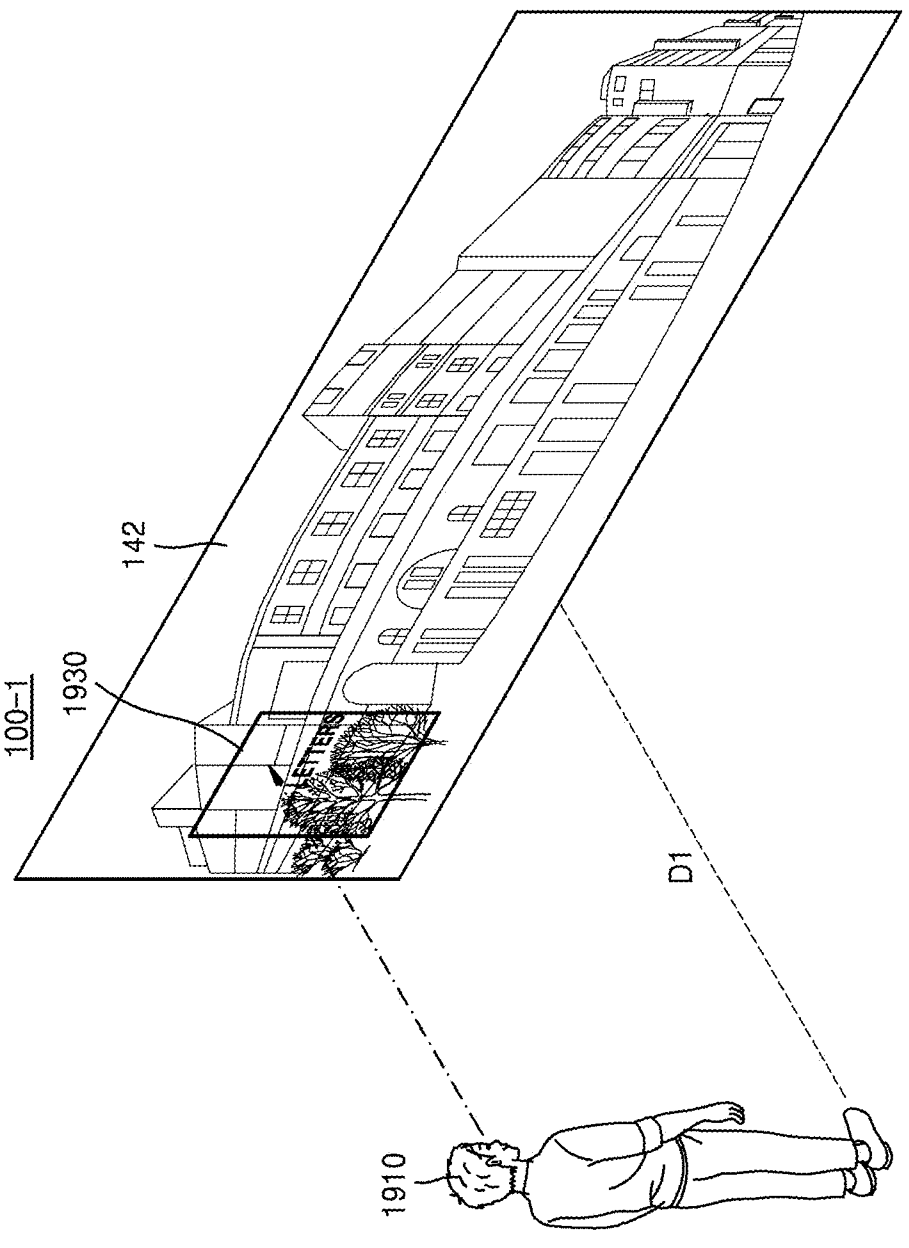
FIG. 19 illustrates another embodiment of an electronic device, according to an embodiment of the disclosure.

FIG. 19 illustrates another example of an electronic device, according to an embodiment of the disclosure.

Referring to FIG. 19, an electronic device 100-1 according to an embodiment of the disclosure may include a display panel 142 on which a screen is provided. The electronic device 100-1 may be, but is not limited to, a large display device for providing immersive content such as metaverse content.

When the electronic device 100 (or the processor 110) determines that a distance D1 between a user 1910 and the screen output through the display panel 142 is within a first threshold distance, the electronic device 100-1 according to an embodiment may control a first area 1930 corresponding to a direction in which the user 1910 is located to be enlarged. Alternatively, the electronic device 100-1 may control a target object included in the first area 1930 corresponding to the direction in which the user 1910 is located to be enlarged. For example, the electronic device 100-1 may control a letter object included in the first area 1930 to be enlarged.

Figure 20:
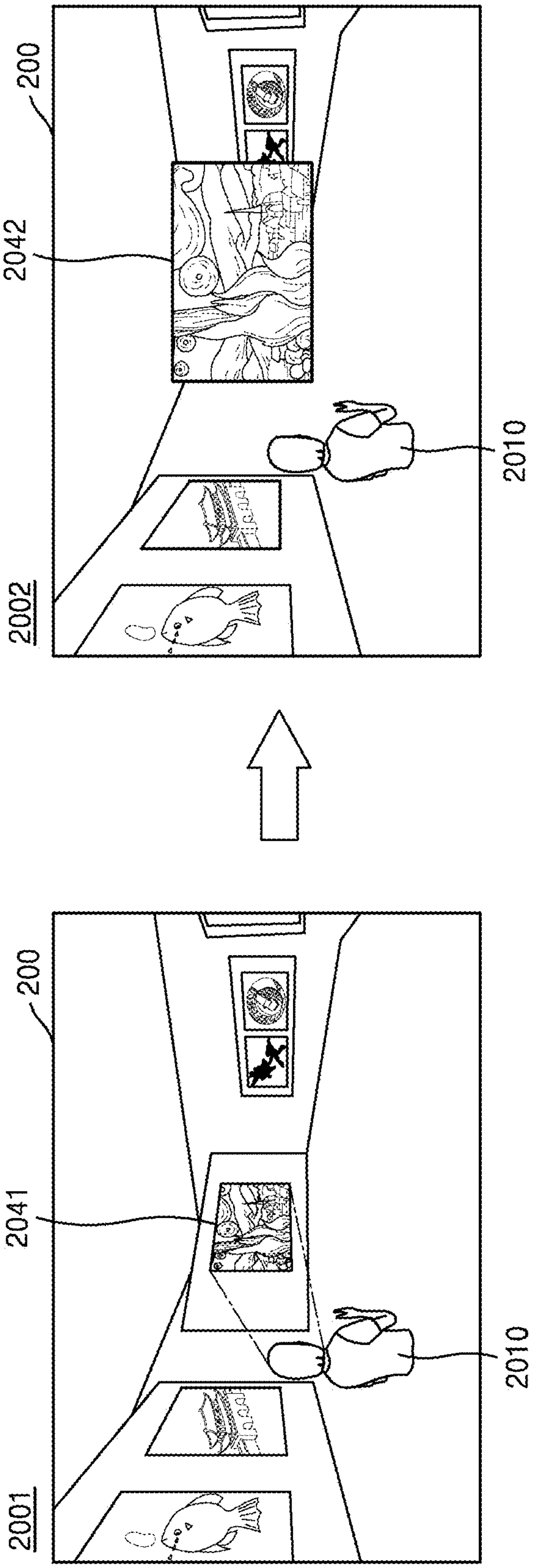
FIG. 20 illustrates another example in which an electronic device provides metaverse content, according to an embodiment of the disclosure.

FIG. 20 illustrates another example in which an electronic device provides metaverse content, according to an embodiment of the disclosure.

Referring to FIG. 20, the electronic device 100 according to an embodiment of the disclosure may output metaverse content by executing an application for providing metaverse content. The metaverse content may be content representing a virtual space provided by a metaverse platform.

An avatar that may be manipulated by a user appears in the metaverse content. The user may manipulate the avatar to, interact with other avatars, or perform actions suitable for various situations. That is, the user may be displayed as an avatar displayed on the screen 200, not as an actual user outside the electronic device 100. In this case, an object to be enlarged may be enlarged based on a gaze of the avatar and a location of the avatar.

2001 of FIG. 20 shows a state of the screen 200 before a target object 2041 is enlarged. For example, the electronic device 100 may determine a gaze of an avatar 2010 manipulated by the user toward the target object 2041, and may determine a distance between the avatar 2010 and the target object 2041. When the electronic device 100 (or the processor 110) determines that the distance between the avatar 2010 and the target object 2041 is within a threshold distance, the electronic device 100 may control the target object 2041 to be enlarged.

2002 of FIG. 20 shows a state of the screen 200 after a target object 2042 is enlarged. For example, the electronic device 100 may display the enlarged target object 2042.

Figure 21:
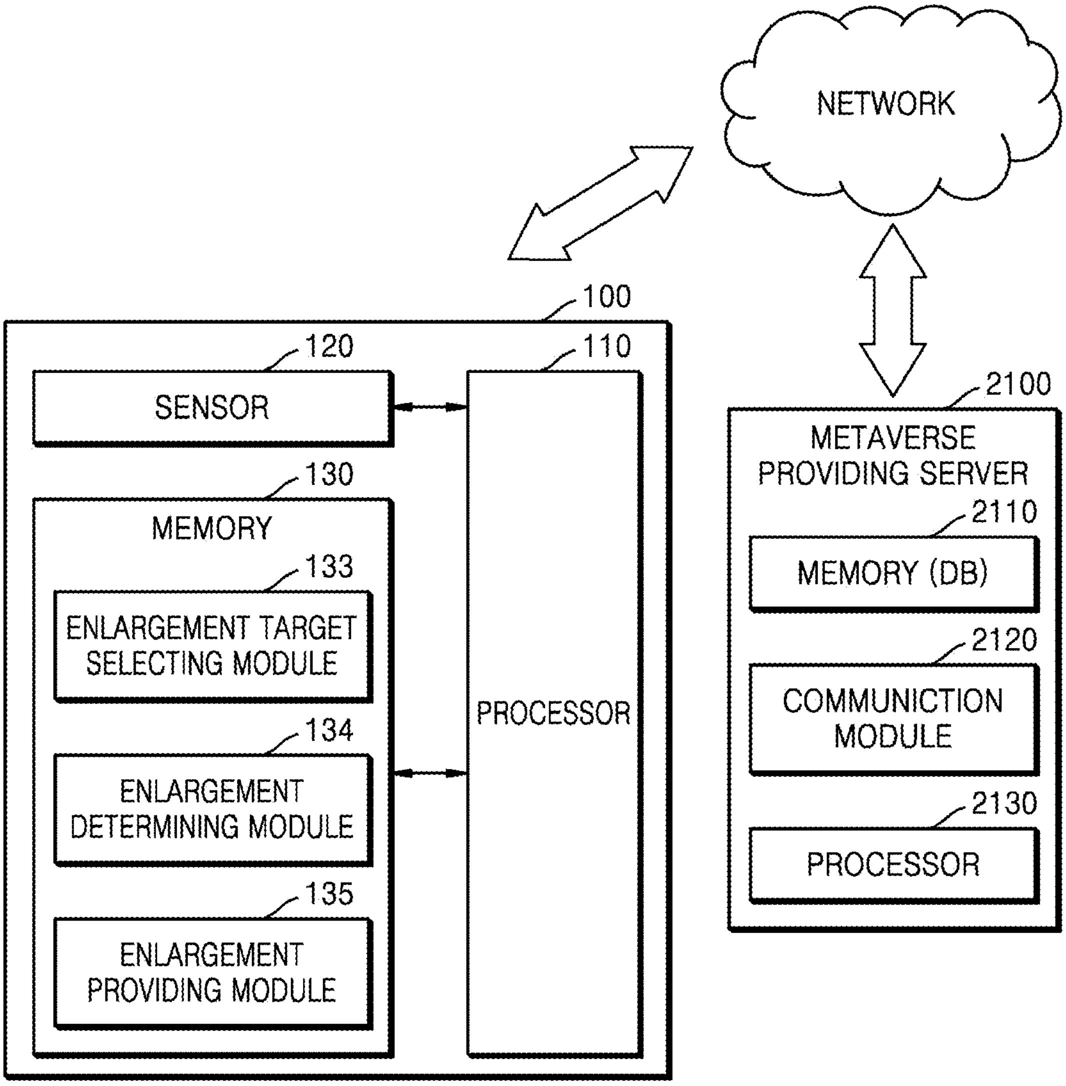
FIG. 21 illustrates a configuration of a system including an electronic device and a metaverse server, according to an embodiment of the disclosure.

FIG. 21 illustrates a configuration of a system including an electronic device and a metaverse server, according to an embodiment of the disclosure.

Referring to FIG. 21, the electronic device 100 may be connected to a metaverse providing server 2100 through a network. Examples of the network may include a wide area network (WAN) such as the Internet, a local area network (LAN) formed around an access point (AP), etc.

The metaverse providing server 2100 may include a communication module 2120 that may communicate with the electronic device 100, a processor 2130 that may process data received from the electronic device 100, and a memory 2110 (or DB) that may store data or a program for processing data.

The memory 2110 according to an embodiment may store information about one or more objects included in a 3D graphic image. The memory 2110 may include an attribute value of at least one of a letter object, a number object, a character object, and an avatar object. The memory 2110 may include an attribute value of a user-customized object.

The electronic device 100 may access the metaverse providing server 2100 and may display metaverse content. The electronic device 100 may communicate with the electronic device 100 through the communication module 170. For example, the processor 110 may receive information about objects stored in the memory 2110 of the server 2100 through the communication module 170. The processor 110 may execute one or more instructions included in the enlargement target selecting module 133 to select a target object from among at least one object included in a first area, based on the received information.

In the disclosure, the electronic device 100 may select a target object through information of objects stored in the memory 130 of the electronic device 100 in the form of an on-device as shown in FIGS. 2 and 3, or may select a target object through information received from the memory 2110 of the metaverse providing server 2100 as shown in FIG. 21.

A machine-readable storage medium may be provided as a non-transitory storage medium. Here, 'non-transitory' means that the storage medium does not include a signal (e.g., an electromagnetic wave) and is tangible, but does not distinguish whether data is stored semi-permanently or temporarily in the storage medium. For example, the 'non-transitory storage medium' may include a buffer in which data is temporarily stored.

According to an embodiment, methods according to various embodiments of the disclosure may be provided in a computer program product. The computer program product may be a product purchasable between a seller and a purchaser. The computer program product may be distributed in the form of a machine-readable storage medium (e.g., a compact disc read-only memory (CD-ROM)), or distributed (e.g., downloaded or uploaded) online via an application store or between two user devices (e.g., smartphones) directly. When distributed online, at least part of the computer program product (e.g., a downloadable application) may be temporarily generated or at least temporarily stored in a machine-readable storage medium, such as a memory of a server of a manufacturer, a server of an application store, or a relay server.

What is claimed is:

1. An electronic device comprising:

at least one sensor;

a memory comprising at least one instruction; and at least one processor configured to execute the at least one instruction to:

determine, through the at least one sensor, a location of a user, wherein the location comprises:

a distance between the user and a screen on which an image, which is output from the electronic device, is displayed, and a location of the user with respect to the electronic device, select a target object in a first area among an entire area displayed on the screen, wherein the target object corresponds to the distance between the user and the screen and corresponds to the location of the user with respect to the electronic device, and control the target object to be enlarged, based on the distance between the user and the screen being within a first threshold distance.

2. The electronic device of claim 1, wherein the at least one sensor comprises an image sensor and a position detection sensor, and wherein the at least one processor is further configured to:

determine, through the image sensor, whether there is a gaze change of the user, and determine, through the position detection sensor, the distance between the user and the screen and the location of the user with respect to the electronic device, based on a determination by the at least one processor that there is the gaze change of the user.

3. The electronic device of claim 1, wherein the at least one processor is further configured to:

determine an area facing a gaze of the user at the location of the user as the first area of the screen, select the target object in the first area, and determine a coordinate value of the selected target object.

4. The electronic device of claim 1, wherein the memory comprises information about one or more objects in the image, and wherein the information comprises an attribute value of at least one of letters, numbers, characters, avatars, or user-customized objects.

5. The electronic device of claim 1, wherein the at least one processor is further configured to:
compare attribute values of objects in the memory with an attribute value detected from at least one object in the first area, and
select the at least one object as the target object, based on the at least one object matching any one of the objects in the memory.

6. The electronic device of claim 1, wherein the at least one processor is further configured to:
control the target object in the first area to be enlarged, based on the user being located within the first threshold distance from the screen for a period of time, and
store information about the target object in the memory.

7. The electronic device of claim 1, wherein the at least one processor is further configured to update, in the memory, a history table comprising:
information about a distance change value between the user and the target object, and
viewing time of the user for the target object.

8. The electronic device of claim 7, wherein the at least one processor is further configured to:
calculate a priority of objects in the memory, based on the updated history table, and
select the target object to be enlarged, based on the calculated priority from among objects in the first area.

9. The electronic device of claim 1, wherein the at least one processor is further configured to display a message asking the user whether to enlarge an object on the screen, based on the distance between the user and the screen being within the first threshold distance.

10. The electronic device of claim 1, wherein the at least one processor is further configured to:
control the first area comprising the target object to be enlarged on a portion of the entire area displayed on the screen, and
control the first area comprising the target object to be enlarged on the entire area of the screen, based on the location in which the user is located, based on the distance between the user and the screen being within a second threshold distance that shorter than the first threshold distance.

11. The electronic device of claim 1, further comprising a communication module configured to communicate with a server,
wherein the at least one processor is further configured to:
receive, through the communication module, information about objects from the server, and
select, based on the received information, the target object from among at least one object included in the first area.

12. The electronic device of claim 1, wherein the electronic device comprises at least one of:
a display panel on which the screen is provided, or
a projector configured to project light onto the screen so that the image is displayed on the screen.

13. A method of controlling an electronic device, the method comprising:
determining, through at least one sensor, a location of a user, wherein the location comprises:
a distance between the user and a screen on which an image output from the electronic device is displayed, and
a location of the user with respect to the electronic device;
selecting a target object in a first area among an entire area displayed on the screen, wherein the target object corresponds to the distance between the user and the screen and corresponds to the location of the user with respect to the electronic device; and
controlling the target object to be enlarged, based on the distance between the user and the screen being within a first threshold distance.

14. The method of claim 13, wherein the determining of the location of the user, comprises:
determining whether there is a gaze change of the user; and
determining, based on the determination that there is the gaze change of the user, the distance between the user and the screen and the location of the user with respect to the electronic device.

15. The method of claim 13, wherein the selecting of the target object included in the first area, comprises:
determining an area facing a gaze of the user at the location of the user as the first area of the screen;
selecting the target object in the first area; and
determining a coordinate value of the selected target object.

* * * * *